(12) United States Patent
Azuma et al.

(10) Patent No.: US 12,339,618 B2
(45) Date of Patent: Jun. 24, 2025

(54) POLYARYLATE RESIN AND ELECTROPHOTOGRAPHIC PHOTOSENSITIVE MEMBER

(71) Applicant: KYOCERA Document Solutions Inc., Osaka (JP)

(72) Inventors: Jun Azuma, Osaka (JP); Keiji Maruo, Osaka (JP); Kenji Kitaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 663 days.

(21) Appl. No.: 17/705,063

(22) Filed: Mar. 25, 2022

(65) Prior Publication Data

US 2022/0342326 A1 Oct. 27, 2022

(30) Foreign Application Priority Data

Apr. 7, 2021 (JP) ................. 2021-065334

(51) Int. Cl.
G03G 5/05 (2006.01)
C08G 63/672 (2006.01)
G03G 5/06 (2006.01)

(52) U.S. Cl.
CPC ......... *G03G 5/0567* (2013.01); *C08G 63/672* (2013.01); *G03G 5/06145* (2020.05)

(58) Field of Classification Search
CPC . G03G 5/0567; G03G 5/06145; C08G 63/672
See application file for complete search history.

(56) References Cited

U.S. PATENT DOCUMENTS 10,359,713 B2 * 7/2019 Shimizu ............... G03G 5/0567
2018/0246402 A1 * 8/2018 Azuma ................ C08G 63/189

FOREIGN PATENT DOCUMENTS

| | | | | |
|---|---|---|---|---|
| JP | H10-020514 A | | 1/1998 | |
| JP | 2007108239 | * | 4/2007 | ............... G03G 5/00 |
| WO | WO-2018079118 A1 | * | 5/2018 | ........... C08G 63/193 |

* cited by examiner

*Primary Examiner* — Peter L Vajda
*Assistant Examiner* — Jenna Kuipers
(74) *Attorney, Agent, or Firm* — Studebaker Brackett PLLC

(57) ABSTRACT

A polyarylate resin includes repeating units represented by formulas (1), (2), (3), and (4).

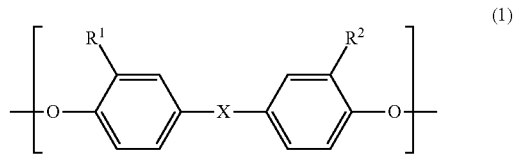

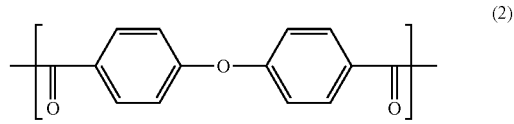

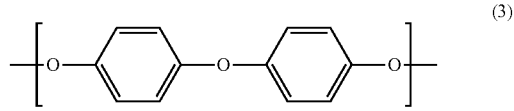

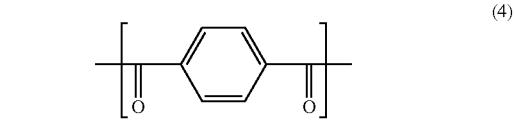

A third percentage is greater than 0% and less than 50%. The third percentage is a percentage of the number of repeats of the repeating unit represented by formula (3) relative to the total of the number of repeats of the repeating unit represented by formula (1) and the number of repeats of the repeating unit represented by formula (3). A fourth percent- (Continued)

age is at least 35% and less than 70%. The fourth percentage is a percentage of the number of repeats of the repeating unit represented by formula (4) relative to the total of the number of repeats of the repeating unit represented by formula (2) and the number of repeats of the repeating unit represented by formula (4).

12 Claims, 3 Drawing Sheets

POLYARYLATE RESIN AND ELECTROPHOTOGRAPHIC PHOTOSENSITIVE MEMBER

INCORPORATION BY REFERENCE

The present application claims priority under 35 U.S.C. § 119 to Japanese Patent Application No. 2021-065334, filed on Apr. 7, 2021. The contents of this application are incorporated herein by reference in their entirety.

BACKGROUND

The present disclosure relates to a polyarylate resin and an electrophotographic photosensitive member.

An electrophotographic image forming apparatus (e.g., a printer or a multifunction peripheral) includes an electrophotographic photosensitive member as an image bearing member. The electrophotographic photosensitive member includes a photosensitive layer. Examples of the electrophotographic photosensitive member include a single-layer electrophotographic photosensitive member and a multi-layer electrophotographic photosensitive member. The single-layer electrophotographic photosensitive member includes a single-layer photosensitive layer having a charge generating function and a charge transporting function. The multi-layer electrophotographic photosensitive member includes a photosensitive layer including a charge generating layer having a charge generating function and a charge transport layer having a charge transporting function.

For example, an electrophotographic photosensitive member is known that has a surface layer containing a polyarylate resin obtained from a divalent phenol component and a divalent carboxylic acid component represented by the following formula.

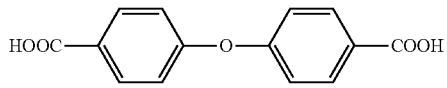 [SMILES: O=C(O)c1ccc(Oc2ccc(C(=O)O)cc2)cc1]

SUMMARY

A polyarylate resin according to an aspect of the present disclosure includes a repeating units represented by formulas (1), (2), (3), and (4). A third percentage is greater than 0% and less than 50%. The third percentage is a percentage of the number of repeats of the repeating unit represented by the formula (3) relative to a total of the number of repeats of the repeating unit represented by the formula (1) and the number of repeats of the repeating unit represented by the formula (3). A fourth percentage is at least 35% and less than 70%. The fourth percentage is a percentage of the number of repeats of the repeating unit represented by the formula (4) relative to a total of the number of repeats of the repeating unit represented by the formula (2) and the number of repeats of the repeating unit represented by the formula (4).

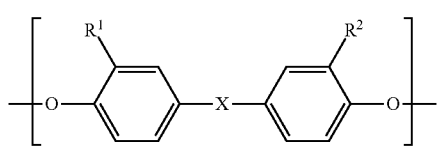

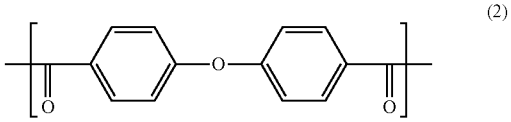

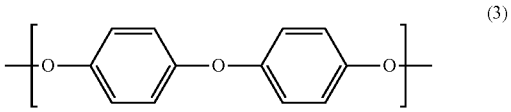

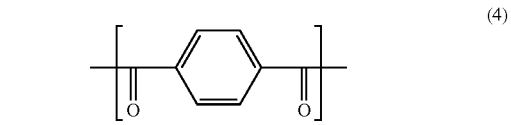

Where in the formula (1), $R^1$ and $R^2$ each represent a methyl group and X represents a divalent group represented by formula (X1). Or, $R^1$ and $R^2$ each represent a hydrogen atom and X represents a divalent group represented by formula (X2).

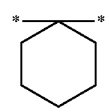

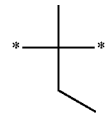

Where in the formulas (X1) and (X2), * represents a bond.

An electrophotographic photosensitive member according to an aspect of the present disclosure includes a conductive substrate and a photosensitive layer. The photosensitive layer contains a charge generating material, a hole transport material, and a binder resin. The binder resin contains the above-described polyarylate resin.

DETAILED DESCRIPTION

Figure 1:
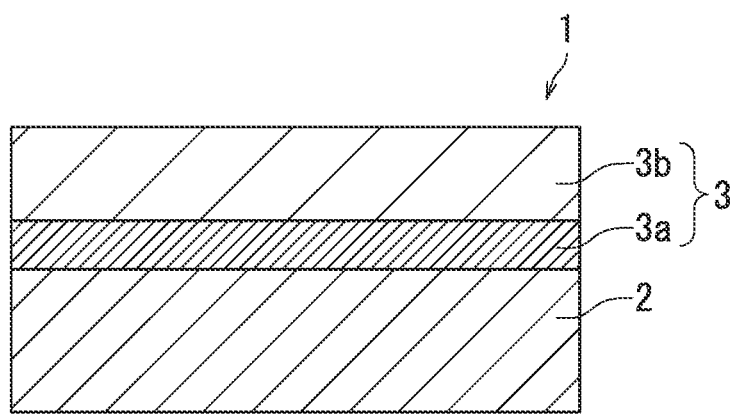
FIG. 1 is a partial cross-sectional view of a multi-layer electrophotographic photosensitive member that is an example of an electrophotographic photosensitive member according to a second embodiment of the present disclosure.

The following describes embodiments of the present disclosure in detail. Note that the present disclosure is not limited to any of the following embodiments and can be practiced within a scope of objects of the present disclosure with alterations made as appropriate. Although some overlapping explanations may be omitted as appropriate, such omission does not limit the gist of the present disclosure. In the following description, the term "-based" may be appended to the name of a chemical compound to form a generic name encompassing both the chemical compound itself and derivatives thereof. When the term "-based" is appended to the name of a chemical compound to represent the name of a polymer, the term indicates that a repeating unit of the polymer originates from the chemical compound or a derivative thereof. Both "general formula" and "chemical formula" are referred collectively to as "formula". The phrase "each represent, independently of one another" in the explanation of a formula indicates representing the same group as each other or representing of groups different from each other. Any one of the components indicated in the present specification may be used independently, or any two or more of the components may be used in combination unless otherwise stated.

Substituents used in the present specification will be described first. Examples of a halogen atom (halogen group) include fluorine atom (fluoro group), chlorine atom (chloro group), bromine atom (bromo group), and iodine atom (iodine group).

An alkyl group with a carbon number of at least 1 and no greater than 8, an alkyl group with a carbon number of at least 1 and no greater than 6, and an alkyl group with a carbon number of at least 1 and no greater than 3 each are an unsubstituted straight chain or branched chain alkyl group unless otherwise stated. Examples of the alkyl group with a carbon number of at least 1 and no greater than 8 include a methyl group, an ethyl group, an n-propyl group, an isopropyl group, an n-butyl group, a sec-butyl group, a tert-butyl group, an n-pentyl group, a 1-methylbutyl group, a 2-methylbutyl group, a 3-methylbutyl group, a 1-ethylpropyl group, a 2-ethylpropyl group, a 1,1-dimethylpropyl group, a 1,2-dimethylpropyl group, a 2,2-dimethylpropyl group, an n-hexyl group, a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 3,3-dimethylbutyl group, a 1,1,2-trimethylpropyl group, a 1,2,2-trimethylpropyl group, a 1-ethylbutyl group, a 2-ethylbutyl group, a 3-ethylbutyl group, a straight chain or branched chain heptyl group, and a straight chain or branched chain octyl group. Examples of the alkyl group with a carbon number of at least 1 and no greater than 6 and the alkyl group with a carbon number of at least 1 and no greater than 3 are groups with corresponding carbon numbers among the groups listed as the examples of the alkyl group with a carbon number of at least 1 and no greater than 8.

A perfluoroalkyl group with a carbon number of at least 1 and no greater than 10, a perfluoroalkyl group with a carbon number of at least 3 and no greater than 10, a perfluoroalkyl group with a carbon number of at least 5 and no greater than 7, and a perfluoroalkyl group with a carbon number of 6 each are an unsubstituted straight chain or branched chain perfluoroalkyl group unless otherwise stated. Examples of the perfluoroalkyl group with a carbon number of at least 1 and no greater than 10 include a trifluoromethyl group, a perfluoroethyl group, a perfluoro-n-propyl group, a perfluoroisopropyl group, a perfluoro-n-butyl group, a perfluoro-sec-butyl group, a perfluoro-tert-butyl group, a perfluoro-n-pentyl group, a perfluoro-1-methylbutyl group, a perfluoro-2-methylbutyl group, a perfluoro-3-methylbutyl group, a perfluoro-1-ethylpropyl group, a perfluoro-2-ethylpropyl group, a perfluoro-1,1-dimethylpropyl group, a perfluoro1,2-dimethylpropyl group, a perfluoro-2,2-dimethylpropyl group, a perfluoro-n-hexyl group, a perfluoro-1-methylpentyl group, a perfluoro-2-methylpentyl group, a perfluoro-3-methylpentyl group, a perfluoro-4-methylpentyl group, a perfluoro-1,1-dimethylbutyl group, a perfluoro-1,2-dimethylbutyl group, a perfluoro-1,3-dimethylbutyl group, a perfluoro-2,2-dimethylbutyl group, a perfluoro-2,3-dimethylbutyl group, a perfluoro-3,3-dimethylbutyl group, a perfluoro-1,1,2-trimethylpropyl group, a perfluoro-1,2,2-trimethylpropyl group, a perfluoro-1-ethylbutyl group, a perfluoro-2-ethylbutyl group, a perfluoro-3-ethylbutyl group, a straight chain or branched chain perfluoroheptyl group, a straight chain or branched chain perfluorooctyl group, a straight chain or branched chain perfluorononyl group, and a straight chain or branched chain perfluorodecyl group. The perfluoroalkyl group with a carbon number of at least 3 and no greater than 10, the perfluoroalkyl group with a carbon number of at least 5 and no greater than 7, and the perfluoroalkyl group with a carbon number of 6 are groups with corresponding carbon numbers among the groups listed as the examples of the perfluoroalkyl group with a carbon number of at least 1 and no greater than 10.

An alkanediyl group with a carbon number of at least 1 and no greater than 6 and an alkanediyl group with a carbon number of at least 1 and no greater than 3 each are an unsubstituted straight chain or branched chain alkanediyl group. Examples of the alkanediyl group with a carbon number of at least 1 and no greater than 6 include a methanediyl group (methylene group), an ethanediyl group, an n-propanediyl group, an isopropanediyl group, an n-butanediyl group, a sec-butanediyl group, a tert-butanediyl group, an n-pentanediyl group, a 1-methylbutanediyl group, a 2-methylbutanediyl group, a 3-methylbutanediyl group, a 1-ethylpropanediyl group, a 2-ethylpropanediyl group, a 1,1-dimethylpropanediyl group, a 1,2-dimethylpropanediyl group, a 2,2-dimethylpropanediyl group, an n-hexanediyl group, a 1-methylpentanediyl group, a 2-methylpentanediyl group, a 3-methylpentanediyl group, a 4-methylpentanediyl group, a 1,1-dimethylbutanediyl group, a 1,2-dimethylbutanediyl group, a 1,3-dimethylbutanediyl group, a 2,2-dimethylbutanediyl group, a 2,3-dimethylbutanediyl group, a 3,3-dimethylbutanediyl group, a 1,1,2-trimethylpropanediyl group, a 1,2,2-trimethylpropanediyl group, a 1-ethylbutanediyl group, a 2-ethylbutanediyl group, and a 3-ethylbutanediyl group. Examples of the alkanediyl group with a carbon number of at least 1 and no greater than 3 are groups with a corresponding carbon number among the groups listed as the examples of the alkanediyl group with a carbon number of at least 1 and no greater than 6.

An alkoxy group with a carbon number of at least 1 and no greater than 8, an alkoxy group with a carbon number of at least 1 and no greater than 6, and an alkoxy group with a carbon number of at least 1 and no greater than 3 each are an unsubstituted straight chain or branched chain alkoxy group unless otherwise stated. Examples of the alkoxy group with a carbon number of at least 1 and no greater than 8 include a methoxy group, an ethoxy group, an n-propoxy group, an isopropoxy group, an n-butoxy group, a sec-butoxy group, a tert-butoxy group, an n-pentoxy group, a 1-methylbutoxy group, a 2-methylbutoxy group, a 3-methylbutoxy group, a 1-ethylpropoxy group, a 2-ethylpropoxy group, a 1,1-dimethylpropoxy group, a 1,2-dimethylpropoxy group, a 2,2-dimethylpropoxy group, an n-hexyloxy group, a 1-methylpentyloxy group, a 2-methylpentyloxy group, a 3-methylpentyloxy group, a 4-methylpentyloxy group, a 1,1-dimethylbutoxy group, a 1,2-dimethylbutoxy group, a 1,3-dimethylbutoxy group, a 2,2-dimethylbutoxy group, a 2,3-dimethylbutoxy group, a 3,3-dimethylbutoxy group, a 1,1,2-trimethylpropoxy group, a 1,2,2-trimetylpropoxy group, a 1-ethylbutoxy group, a 2-ethylbutoxy group, a 3-ethylbutoxy group, a straight chain or branched chain heptyloxy group, and a straight chain or branched chain octyloxy group. Examples of the alkoxy group with a carbon number of at least 1 and no greater than 6 and the alkoxy group with a carbon number of at least 1 and no greater than 3 are groups with corresponding carbon numbers among the groups listed as the examples of the alkoxy group with a carbon number of at least 1 and no greater than 8.

A cycloalkane with a carbon number of at least 5 and no greater than 7 is an unsubstituted cycloalkane unless otherwise stated. Examples of the cycloalkane with a carbon number of at least 5 and no greater than 7 include cyclopentane, cyclohexane, and cycloheptane. The substituents used in the present specification have been described so far.

First Embodiment: Polyarylate Resin

A first embodiment of the present disclosure relates to a polyarylate resin. The polyarylate resin according to the first embodiment includes repeating units represented by formulas (1), (2), (3), and (4). In the polyarylate resin of the first embodiment, a third percentage is greater than 0% and less than 50%. The third percentage is a percentage of the number of repeats of the repeating unit represented by formula (3) relative to the total of the number of repeats of the repeating unit represented by formula (1) and the number of repeats of the repeating unit represented by formula (3). In the polyarylate resin of the first embodiment, a fourth percentage is at least 35% and less than 70%. The fourth percentage is a percentage of the number of repeats of the repeating unit represented by formula (4) relative to the total of the number of repeats of the repeating unit represented by formula (2) and the number of repeats of the repeating unit represented by formula (4).

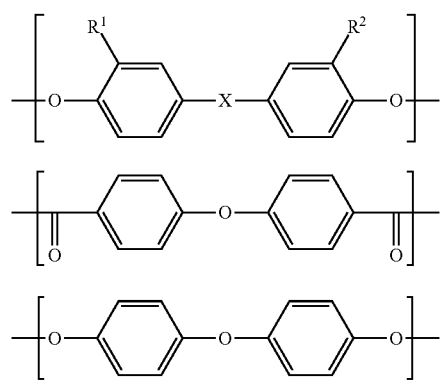

In formula (1), $R^1$ and $R^2$ each represent a methyl group and X represents a divalent group represented by formula (X1). Or, $R^1$ and $R^2$ each represent a hydrogen atom and X represents a divalent group represented by formula (X2).

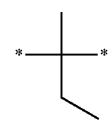

In formulas (X1) and (X2), * represents a bond. The bond represented by * in formulas (X1) and (X2) are bonded to a carbon atom to which X in formula (1) is bonded.

In the following, "the repeating units represented by formulas (1), (2), (3), and (4)" may be referred to as "repeating units (1), (2), (3), and (4)", respectively. Also, a "polyarylate resin including the repeating units (1), (2), (3), and (4) with a third percentage of greater than 0% and less than 50% and a fourth percentage of at least 35% and less than 70%" may be referred to as "polyarylate resin (PA)".

The polyarylate resin (PA) has excellent solubility in a solvent. Furthermore, the polyarylate resin (PA) prevents failure resulting from member contact in an electrophotographic photosensitive member (also referred to below as photosensitive member) when contained in a photosensitive layer of the photosensitive member, and can increase abrasion resistance of the photosensitive member. Examples of failure resulting from member contact include failure in which a recess is formed in a surface portion of a photosensitive member of an image forming apparatus under storage in a state in which a member (e.g., a charging roller) included in the image forming apparatus is in contact with the photosensitive member, and failure in which a component of the member is attached to the surface of the photosensitive member. Failure resulting from member contact tends to occur especially in a high-temperature and high-humidity environment.

Where $R^1$ and $R^2$ each represent a methyl group and X represents a divalent group represented by formula (X1) in formula (1), the repeating unit (1) is a repeating unit represented by formula (1-1) (also referred to below as repeating unit (1-1)). Where $R^1$ and $R^2$ each represent a hydrogen atom and X represents a divalent group represented by formula (X2) in formula (1), the repeating unit (1) is a repeating unit represented by formula (1-2) (also referred to below as repeating unit (1-2)). The polyarylate resin (PA) may include only one repeating unit (1) or may include two repeating units (1).

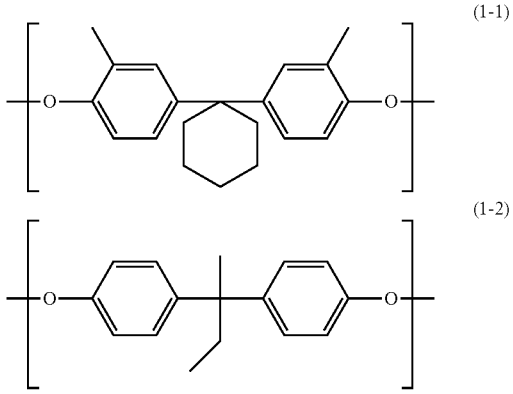

A percentage of the number of repeats of the repeating unit (1) relative to the total of the number of repeats of the repeating unit (1) and the number of repeats of the repeating unit (3) is referred to as first percentage. The first percentage corresponds to a percentage (i.e., $100 \times N_1/(N_1+N_3)$) of the number $N_1$ of repeats of the repeating unit (1) relative to the total of the number $N_1$ of repeats of the repeating unit (1) and the number $N_3$ of repeats of the repeating unit (3) in the polyarylate resin (PA). Note that in a case in which the polyarylate resin (PA) includes two repeating units (1), the number $N_1$ of repeats of the repeating unit (1) is the total number of repeats of each of the two repeating units (1).

The first percentage is preferably less than 100%, more preferably no greater than 99%, further preferably no greater than 90%, further more preferably no greater than 80%, still further preferably no greater than 70%, still further more preferably less than 70%, and particularly preferably no greater than 65%. The first percentage is preferably greater than 50%, more preferably at least 51%, and further preferably at least 55%. In order to prevent failure resulting from member contact of a photosensitive member including a photosensitive layer containing the polyarylate resin (PA) and increase abrasion resistance of the photosensitive member, the first percentage is preferably greater than 50% and no greater than 70%, and more preferably greater than 50% and less than 70%.

A percentage of the number of repeats of the repeating unit (2) relative to the total of the number of repeats of the repeating unit (2) and the number of repeats of the repeating unit (4) is referred to as second percentage. The second percentage corresponds to a percentage (i.e., $100 \times N_2/(N_2+N_4)$) of the number $N_2$ of repeats of the repeating unit (2) relative to the total of the number $N_2$ of repeats of the repeating unit (2) and the number $N_4$ of repeats of the repeating unit (4) in the polyarylate resin (PA).

The second percentage is preferably no greater than 65%, and more preferably no greater than 60%. The second percentage is preferably greater than 30%, more preferably at least 31%, further preferably at least 35%, still further preferably at least 40%, and particularly preferably at least 55%. In order to prevent failure resulting from member contact of a photosensitive member including a photosensitive layer containing the polyarylate resin (PA), the second percentage is preferably greater than 30% and no greater than 60%. In order to increase abrasion resistance of a photosensitive member including a photosensitive layer containing the polyarylate resin (PA), the second percentage is preferably at least 55% and no greater than 65%.

As described previously, the third percentage is greater than 0% and less than 50%. The third percentage corresponds to a percentage (i.e., $100 \times N_3/(N_1+N_3)$) of the number $N_3$ of repeats of the repeating unit (3) relative to the total of the number $N_1$ of repeats of the repeating unit (1) and the number $N_3$ of repeats of the repeating unit (3) in the polyarylate resin (PA).

As a result of the third percentage being less than 50%, the polyarylate resin (PA) can have increased solubility in a solvent. As a result of the third percentage being greater than 0%, that is, as a result of the third percentage not being 0%, abrasion resistance of a photosensitive member including a photosensitive layer containing the polyarylate resin (PA) can be increased. The third percentage is preferably at least 1%, more preferably at least 10%, further preferably at least 20%, further more preferably at least 30%, still further preferably greater than 30%, and particularly preferably at least 35%. The third percentage is preferably no greater than 49%, and more preferably no greater than 45%.

In order to prevent failure resulting from member contact of a photosensitive member including a photosensitive layer containing the polyarylate resin (PA) and increase abrasion resistance of the photosensitive member, the third percentage is preferably at least 30% and less than 50%, and more preferably greater than 30% and less than 50%.

As described previously, the fourth percentage is at least 35% and less than 70%. The fourth percentage corresponds to a percentage (i.e., $100 \times N_4/(N_2+N_4)$) of the number $N_4$ of repeats of the repeating unit (4) relative to the total of the number $N_2$ of repeats of the repeating unit (2) and the number $N_4$ of repeats of the repeating unit (4) in the polyarylate resin (PA).

As a result of the fourth percentage being at least 35%, failure resulting from member contact of a photosensitive member including a photosensitive layer containing the polyarylate resin (PA) can be prevented. As a result of the fourth percentage being at least 35%, the polyarylate resin (PA) can have increased solubility in a solvent. By contrast, as a result of the fourth percentage being less than 70%, abrasion resistance of a photosensitive member including a photosensitive layer containing the polyarylate resin (PA) can be increased. The fourth percentage is preferably at least 40%. The fourth percentage is preferably no greater than 69%, more preferably no greater than 65%, further preferably no greater than 60%, and further more preferably no greater than 45%.

In order to prevent failure resulting from member contact of a photosensitive member including a photosensitive layer containing the polyarylate resin (PA), the fourth percentage is preferably at least 40% and less than 70%. In order to increase abrasion resistance of a photosensitive member including a photosensitive layer containing the polyarylate resin (PA), the fourth percentage is preferably at least 35% and no greater than 45%.

Each of the first percentage, the second percentage, the third percentage, and the fourth percentage can be obtained in a manner in which a $^1$H-NMR spectrum of the polyarylate resin (PA) is plotted using a proton nuclear magnetic resonance spectrometer and a characteristic peak ratio of each repeating unit on the plotted $^1$H-NMR spectrum is calculated.

In order to increase solubility in a solvent, prevent failure resulting from member contact of a photosensitive member including a photosensitive layer containing the polyarylate resin (PA), and increase abrasion resistance of the photosensitive member, it is preferable that the first percentage differs from the second percentage and the fourth percentage. For the same purpose as above, it is preferable that the third percentage differs from the second percentage and the fourth percentage.

In order to further prevent failure resulting from member contact of a photosensitive member including a photosensitive layer containing the polyarylate resin (PA), it is preferable that $R^1$ and $R^2$ each represent a methyl group and X represents a divalent group represented by formula (X1) in formula (1) and the fourth percentage is at least 40% and less than 70%.

In order to achieve a good balance between prevention of failure resulting from member contact a photosensitive member including a photosensitive layer containing the polyarylate resin (PA) and an increase in abrasion resistance of the photosensitive member, it is preferable that $R^1$ and $R^2$ each represent a methyl group and X represents a divalent group represented by formula (X1) in formula (1) and the third percentage is at least 30% and less than 50%.

In order to further increase abrasion resistance of a photosensitive member including a photosensitive layer containing the polyarylate resin (PA), it is preferable that $R^1$ and $R^2$ each represent a hydrogen atom and X represents a divalent group represented by formula (X2) in formula (1) and the fourth percentage is at least 35% and no greater than 45%.

In order to prevent failure resulting from member contact a photosensitive member including a photosensitive layer containing the polyarylate resin (PA) and increase abrasion resistance of the photosensitive member without impairing chargeability and sensitivity of the photosensitive member, the polyarylate resin (PA) preferably does not include a repeating unit with a biphenyl structure. An example of the repeating unit with a biphenyl structure is a repeating unit represented by formula (5). Examples of the repeating unit represented by formula (5) include repeating units represented by formulas (5-1) and (5-2).

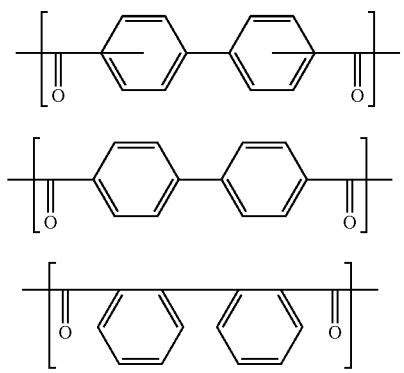

In order to further increase abrasion resistance of a photosensitive member including a photosensitive layer containing the polyarylate resin (PA), the polyarylate resin (PA) preferably does not include a repeating unit derived from isophthalic acid.

The polyarylate resin (PA) may have an end group. Examples of the end group of the polyarylate resin (PA) include end groups represented by formulas (T-1) and (T-2). The end group represented by formula (T-1) is preferably an end group represented by formula (T-DMP) (also referred to below as end group (T-DMP)). The end group represented by formula (T-2) is preferably an end group represented by formula (T-PFH) (also referred to below as end group (T-PFH)).

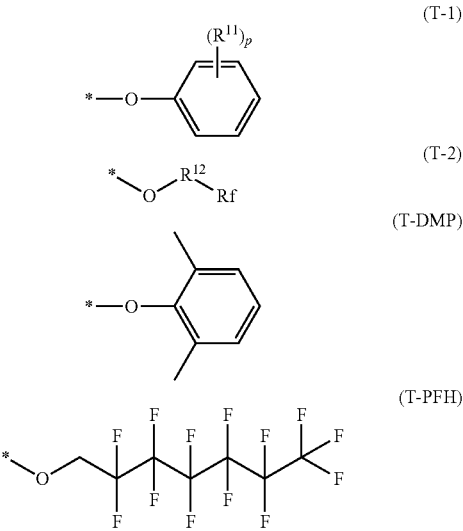

In formula (T-1), $R^{11}$ represents a halogen atom or an alkyl group with a carbon number of at least 1 and no greater than 6 and p represents an integer of at least 0 and no greater than 5. $R^{11}$ preferably represents an alkyl group with a carbon number of at least 1 and no greater than 6, more preferably represents an alkyl group with a carbon number of at least 1 and no greater than 3, and further preferably represents a methyl group. p preferably represents an integer of at least 1 and no greater than 3, and more preferably represents 2.

In formula (T-2), $R^{12}$ represents an alkanediyl group with a carbon number of at least 1 and no greater than 6 and Rf represents a perfluoroalkyl group with a carbon number of at least 1 and no greater than 10. $R^{12}$ preferably represents an alkanediyl group with a carbon number of at least 1 and no greater than 3, and more preferably represents a methylene group. Rf preferably represents a perfluoroalkyl group with a carbon number of at least 3 and no greater than 10, more preferably represents a perfluoroalkyl group with a carbon number of at least 5 and no greater than 7, and further preferably represents a perfluoroalkyl group with a carbon number of 6.

In each of formulas (T-1), (T-2), (T-DMP), and (T-PFH), * represents a bond. The bond represented by * in each of formulas (T-1), (T-2), (T-DMP), and (T-PFH) is bonded to a repeating unit (specifically, a repeating unit (2) or (4)) derived from a dicarboxylic acid and located at the end of the polyarylate resin (PA).

In order to further prevent failure resulting from member contact of a photosensitive member including a photosensitive layer containing the polyarylate resin (PA) and further increase abrasion resistance of the photosensitive member, the polyarylate resin (PA) preferably has an end group having a halogen atom. For the same purpose as above, it is preferable that $R^1$ and $R^2$ each represent a methyl group and X represents a divalent group represented by formula (X1) in formula (1) and the polyarylate resin (PA) has an end group having a halogen atom.

An example of the end group having a halogen atom is an end group (T-1) in which $R^{11}$ in formula (T-1) represents a halogen atom. Another example of the end group having a halogen atom is the end group (T-2).

Preferable examples of the polyarylate resin (PA) include polyarylate resins (PA-1) and (PA-2) shown in Table 1. The polyarylate resins (PA-1) and (PA-2) each include corresponding repeating units shown in Table 1 as the respective repeating units (1) to (4). Further preferable examples of the polyarylate resin (PA) include polyarylate resins (PA-a) to (PA-d) shown in Table 2. The polyarylate resins (PA-a) to (PA-d) have respective end groups shown in Table 2 and include repeating units shown in Table 2 as the respective repeating units (1) to (4). "Units (1) to (4)" in Tables 1 and 2 indicate "repeating units (1) to (4)", respectively.

TABLE 1

| Polyarylate resin | Unit (1) | Unit (2) | Unit (3) | Unit (4) |
|---|---|---|---|---|
| PA-1 | 1-1 | 2 | 3 | 4 |
| PA-2 | 1-2 | 2 | 3 | 4 |

TABLE 2

| Polyarylate resin | Unit (1) | Unit (2) | Unit (3) | Unit (4) | End group |
|---|---|---|---|---|---|
| PA-a | 1-1 | 2 | 3 | 4 | T-DMP |
| PA-b | 1-2 | 2 | 3 | 4 | T-DMP |
| PA-c | 1-1 | 2 | 3 | 4 | T-PFH |
| PA-d | 1-2 | 2 | 3 | 4 | T-PFH |

In the polyarylate resin (PA), a repeating unit (specifically, the repeating unit (1) or (3)) derived from bisphenol and a repeating unit (specifically, the repeating unit (2) or (4)) derived from dicarboxylic acid are adjacent and bonded to each other. That is, the repeating unit (1) may be bonded to the repeating unit (2) or bonded to the repeating unit (4). Furthermore, the repeating unit (3) may be bonded to the repeating unit (2) or bonded to the repeating unit (4). The number of repeats of the repeating units derived from bisphenols and the number of repeats of the repeating units derived from dicarboxylic acids are substantially the same as each other, and satisfy a calculation formula "number of repeats of repeating units derived from dicarboxylic acids=number of repeats of repeating units derived from bisphenols+1". The polyarylate resin (PA) may be a random copolymer, an alternating copolymer, a periodic copolymer, or a block copolymer, for example.

The polyarylate resin (PA) may further include a repeating unit other than the repeating units (1) to (4) as a repeating unit. However, in order to increase solubility in a solvent, prevent failure resulting from member contact of a photosensitive member including a photosensitive layer containing the polyarylate resin (PA), and increase abrasion resistance of the photosensitive member, the percentage of the number of repeats of the repeating units (1) to (4) relative to the total of the numbers of repeats of repeating units included in the polyarylate resin (PA) is preferably at least 80%, more preferably at least 90%, further more preferably 95%, still further preferably at least 99%, and particularly preferably 100%. That is, the polyarylate resin (PA) particularly preferably includes only the repeating units (1) to (4) as repeating units.

The percentage of the number of repeats of the repeating unit (1) relative to the total of the numbers of repeats of the repeating units derived from bisphenol in the polyarylate resin (PA) is preferably greater than 50% and less than 100%, more preferably at least 55% and no greater than 90%, further preferably at least 60% and no greater than 80%, further more preferably at least 60% and no greater than 70%, and still further preferably at least 60% and less than 70%. The percentage of the number of repeats of the repeating unit (3) relative to the total of the numbers of repeats of the repeating units derived from bisphenol in the polyarylate resin (PA) is preferably greater than 0% and less than 50%, more preferably at least 10% and no greater than 45%, further preferably at least 20% and no greater than 40%, further more preferably at least 30% and no greater than 40%, and still further preferably greater than 30% and no greater than 40%.

The percentage of the number of repeats of the repeating unit (2) relative to the total of the numbers of repeats of the repeating units derived from dicarboxylic acid in the polyarylate resin (PA) is preferably greater than 30% and no greater than 65%, more preferably at least 35% and no greater than 65%, and further preferably at least 40% and no greater than 60%. The percentage of the number of repeats of the repeating unit (4) relative to the total of the numbers of repeats of the repeating units derived from dicarboxylic acid in the polyarylate resin (PA) is preferably at least 35% and less than 70%, more preferably at least 35% and no greater than 65%, and further preferably at least 40% and no greater than 60%.

The polyarylate resin (PA) has a viscosity average molecular weight of preferably at least 10,000, more preferably at least 30,000, further preferably at least 50,000, and particularly preferably at least 55,000. As a result of the polyarylate resin (PA) having a viscosity average molecular weight of at least 10,000, a photosensitive member including a photosensitive layer containing the polyarylate resin (PA) has increased abrasion resistance. By contrast, the polyarylate resin (PA) has a viscosity average molecular weight of preferably no greater than 80,000, more preferably no greater than 70,000, and further preferably no greater than 60,000. As a result of the polyarylate resin (PA) having a viscosity average molecular weight of no greater than 80,000, solubility of the polyarylate resin (PA) in a solvent is increased. The viscosity average molecular weight of the polyarylate resin (PA) is measured in accordance with the Japanese Industrial Standards (JIS) K7252-1:2016.

A production method of the polyarylate resin (PA) will be described next. An example of the production method of the polyarylate resin (PA) is condensation polymerization of bisphenols for forming repeating units derived from bisphenols and dicarboxylic acids for forming repeating units derived from dicarboxylic acids. Any known synthesis method (e.g., solution polymerization, melt polymerization, or interface polymerization) can be employed as condensation polymerization.

Examples of the bisphenols for forming repeating units derived from bisphenols include compounds represented by formulas (BP-1) and (BP-3) (also referred to below as compounds (BP-1) and (BP-3), respectively). Examples of the dicarboxylic acids for forming repeating units derived from dicarboxylic acids include compounds represented by formulas (DC-2) and (DC-4) (also referred to below as compounds (DC-2) and (DC-4), respectively). $R^1$, $R^2$, and X in formula (BP-1) are respectively the same as defined for $R^1$, $R^2$, and X in formula (1).

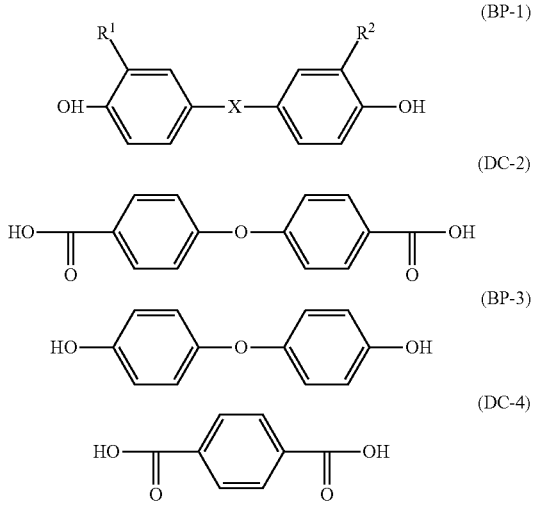

In production of the polyarylate resin (PA), the first percentage can be adjusted by changing the amount (unit: mol) of the compound (BP-1) added relative to the total of the amounts (unit:mol) of the compounds (BP-1) and (BP-3) added. Also, the second percentage can be adjusted by changing the amount (unit:mol) of the compound (DC-2) added relative to the total of amounts (unit:mol) of the compounds (DC-2) and (DC-4) added. The third percentage can be adjusted by changing the amount (unit:mol ) of the compound (BP-3) added relative to the total of the amounts (unit:mol) of the compounds (BP-1) and (BP-3) added. The fourth percentage can be adjusted by changing the amount (unit:mol) of the compound (DC-4) added relative to the total of the amounts (unit:mol) of the compounds (DC-2) and (DC-4) added.

The bisphenols may be derivatized in an aromatic diacetate for use. The dicarboxylic acids may be derivatized for use. Examples of a derivative of dicarboxylic acid include a dicarboxylic acid dichloride, dicarboxylic acid dimethyl ester, dicarboxylic acid diethyl ester, and dicarboxylic acid anhydride. Dicarboxylic acid dichloride is a compound in which two "—C(=O)—OH" groups of dicarboxylic acid have each been replaced by a "—C(=O)—Cl" group.

In condensation polymerization of bisphenols and dicarboxylic acids, a terminator may be added. Examples of the terminator include 2,6-dimethylphenol and 1H,1H-perfluoro-1-heptanol. As a result of 2,6-dimethylphenol being used as the terminator, the end group (T-DMP) can be formed. As a result of 1H,1H-perfluoro-1-heptanol being used as the terminator, the end group (T-PFH) can be formed.

In condensation polymerization of bisphenols and dicarboxylic acids, either or both a base and a catalyst may be added. An example of the base is sodium hydroxide. Examples of the catalyst include benzyltributylammonium chloride, ammonium chloride, ammonium bromide, quaternary ammonium salt, triethylamine, and trimethylamine.

Second Embodiment: Photosensitive Member

A second embodiment of the present disclosure relates to a photosensitive member. The photosensitive member of the second embodiment includes a conductive substrate and a photosensitive layer. The photosensitive layer contains a charge generating material, a hole transport material, and a binder resin. The photosensitive member is a single-layer electrophotographic photosensitive member (also referred to below as single-layer photosensitive member) or a multi-layer electrophotographic photosensitive member (also referred to below as multi-layer photosensitive member), for example.

(Multi-layer Photosensitive Member)

Figure 2:
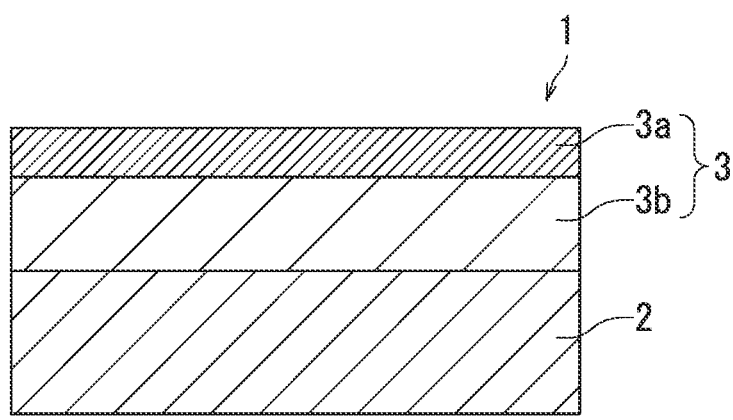
FIG. 2 is a partial cross-sectional view of a multi-layer electrophotographic photosensitive member that is another example of the electrophotographic photosensitive member according to the second embodiment of the present disclosure.
Figure 3:
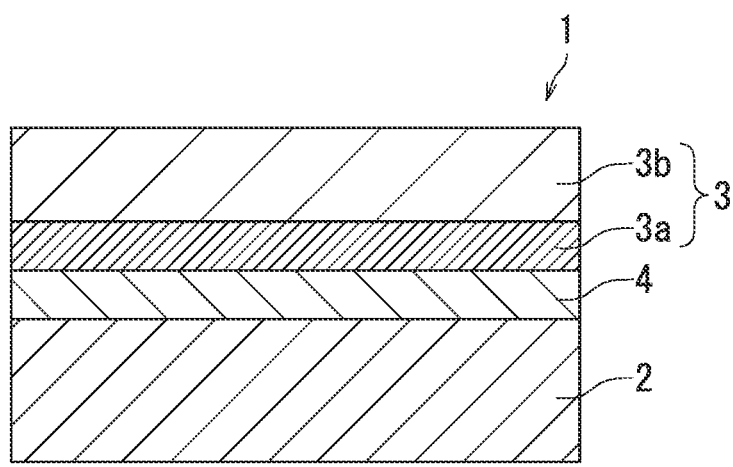
FIG. 3 is a partial cross-sectional view of a multi-layer electrophotographic photosensitive member that is still another example of the electrophotographic photosensitive member according to the second embodiment of the present disclosure.

The following describes a multi-layer photosensitive member 1 as an example of the photosensitive member with reference to FIGS. 1 to 3. FIGS. 1 to 3 each are a partial cross-sectional view of the multi-layer photosensitive member 1.

As illustrated in FIG. 1, the multi-layer photosensitive member 1 includes a conductive substrate 2 and a photosensitive layer 3, for example. The photosensitive layer 3 includes a charge generating layer 3a and a charge transport layer 3b. That is, the multi-layer photosensitive member 1 includes a charge generating layer 3a and a charge transport layer 3b as a photosensitive layer 3. The charge generating layer 3a is a single layer, for example. The charge transport layer 3b is a single layer, for example.

As illustrated in FIG. 1, it is possible that the charge generating layer 3a is disposed on the conductive substrate 2 and the charge transport layer 3b is disposed on the charge generating layer 3a. Alternatively, as illustrated in FIG. 2, it is possible that the charge transport layer 3b is disposed on the conductive substrate 2 and the charge generating layer 3a is disposed on the charge transport layer 3b.

As illustrated in FIG. 3, the multi-layer photosensitive member 1 may further include an intermediate layer 4 (undercoat layer) in addition to the conductive substrate 2 and the photosensitive layer 3. The intermediate layer 4 is disposed between the conductive substrate 2 and the photosensitive layer 3. As illustrated in FIGS. 1 and 2, the photosensitive layer 3 may be disposed directly on the conductive substrate 2 in the multi-layer photosensitive member 1. Alternatively, as illustrated in FIG. 3, the photosensitive layer 3 may be disposed on the conductive substrate 2 with the intermediate layer 4 therebetween in the multi-layer photosensitive member 1. In a case in which the multi-layer photosensitive member 1 includes the intermediate layer 4, it is possible that the intermediate layer 4 is disposed on the conductive substrate 2, the charge generating layer 3a is disposed on the intermediate layer 4, and the charge transport layer 3b is disposed on the charge generating layer 3a as illustrated in FIG. 3. Alternatively, it is possible that the intermediate layer 4 is disposed on the conductive substrate 2, the charge transport layer 3b is disposed on the intermediate layer 4, and the charge generating layer 3a is disposed on the charge transport layer 3b.

The multi-layer photosensitive member 1 may further include a protective layer 5 (see FIG. 6) in addition to the conductive substrate 2 and the photosensitive layer 3. The protective layer 5 is disposed on the photosensitive layer 3. As illustrated in FIGS. 1 to 3, the photosensitive layer 3 (e.g., the charge transport layer 3b or the charge generating layer 3a) may be included in the multi-layer photosensitive member 1 as an outermost layer of the multi-layer photosensitive member 1. Alternatively, the protective layer 5 may be included in the multi-layer photosensitive member 1 as an outermost layer of the multi-layer photosensitive member 1.

As illustrated in FIG. 1, the photosensitive layer 3 (preferably, the charge transport layer 3b) is preferably provided as an outermost layer of the multi-layer photosensitive member 1. It is further preferable that the charge transport layer 3b is a single layer serving as an outermost layer of the multi-layer photosensitive member 1. As a result of provision of the charge transport layer 3b containing the polyarylate resin (PA) as an outermost layer, abrasion resistance of the multi-layer photosensitive member 1 can be further increased.

The charge generating layer 3a contains a charge generating material. The charge generating layer 3a may contain a base resin as necessary. The charge generating layer 3a may contain an additive as necessary. Although no particular limitations are placed on the thickness of the charge generating layer 3a, the charge generating layer 3a has a thickness of preferably at least 0.01 µm and no greater than 5 µm, and more preferably at least 0.1 µm and no greater than 3 µm.

The charge transport layer 3b contains a hole transport material and a binder resin. The charge transport layer 3b may contain an additive as necessary. Although no particular limitations are placed on the thickness of the charge transport layer 3b, the charge transport layer 3b has a thickness of preferably at least 2 µm and no greater than 100 µm, and more preferably at least 5 µm and no greater than 50 µm. The multi-layer photosensitive member 1 has been described so far with reference to FIGS. 1 to 3.

(Single-layer Photosensitive Member)

Figure 4:
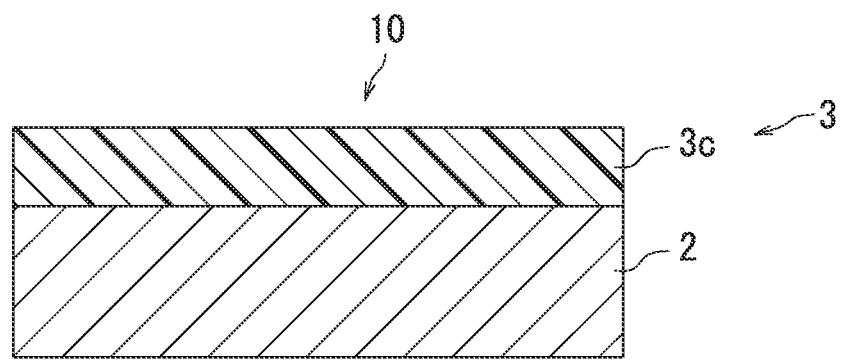
FIG. 4 is a partial cross-sectional view of a single-layer electrophotographic photosensitive member that is an example of the electrophotographic photosensitive member according to the second embodiment of the present disclosure.
Figure 5:
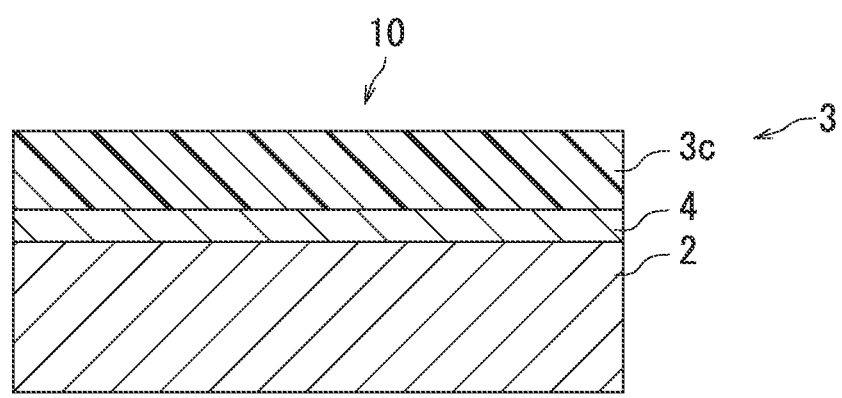
FIG. 5 is a partial cross-sectional view of a single-layer electrophotographic photosensitive member that is yet another example of the electrophotographic photosensitive member according to the second embodiment of the present disclosure.
Figure 6:
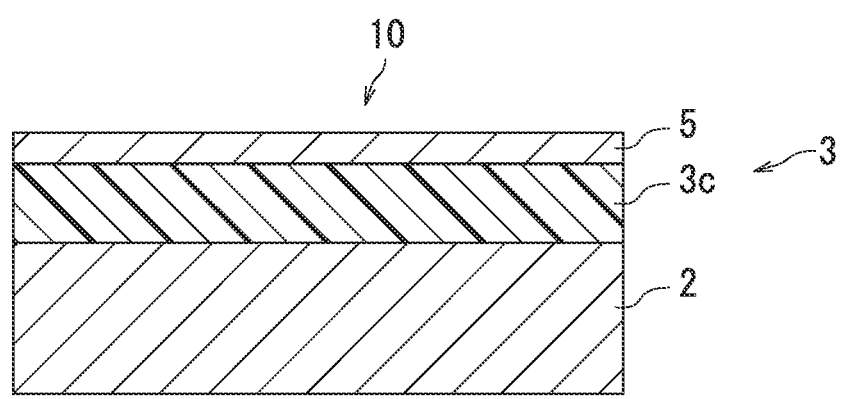
FIG. 6 is a partial cross-sectional view of a single-layer electrophotographic photosensitive member that is still another example of the electrophotographic photosensitive member according to the second embodiment of the present disclosure.

A single-layer photosensitive member 10 that is an example of the photosensitive member will be described next with reference to FIGS. 4 to 6. FIGS. 4 to 6 each are a partial cross-sectional view of the single-layer photosensitive member 10.

As illustrated in FIG. 4, the single-layer photosensitive member 10 includes a conductive substrate 2 and a photosensitive layer 3, for example. The photosensitive layer 3 of the single-layer photosensitive member 10 is a single layer. In the following, the "photosensitive layer 3 of a single layer" may be also referred to below as "single-layer photosensitive layer 3c".

As illustrated in FIG. 5, the single-layer photosensitive member 10 may further include an intermediate layer 4 (undercoat layer) in addition to the conductive substrate 2 and the single-layer photosensitive layer 3c. The intermediate layer 4 is disposed between the conductive substrate 2 and the single-layer photosensitive layer 3c. As illustrated in FIG. 4, the single-layer photosensitive layer 3c may be disposed directly on the conductive substrate 2. Alternatively, the single-layer photosensitive layer 3c may be disposed on the conductive substrate 2 with the intermediate layer 4 therebetween as illustrated in FIG. 5.

As illustrated in FIG. 6, the single-layer photosensitive member 10 may further include a protective layer 5 in addition to the conductive substrate 2 and the single-layer photosensitive layer 3c. The protective layer 5 is disposed on the single-layer photosensitive layer 3c. As illustrated in FIGS. 4 and 5, the single-layer photosensitive layer 3c may be included in the single-layer photosensitive member 10 as an outermost layer of the single-layer photosensitive member 10. Alternatively, the protective layer 5 may be included in the single-layer photosensitive member 10 as an outermost layer of the single-layer photosensitive member 10 as illustrated in FIG. 6.

As illustrated in FIGS. 4 and 5, the photosensitive layer 3 (specifically, the single-layer photosensitive layer 3c) is provided as an outermost layer of the single-layer photosensitive member 10. As a result of provision of the single-layer photosensitive layer 3c containing the polyarylate resin (PA) as an outermost layer, the single-layer photosensitive member 10 can have further increased abrasion resistance.

The single-layer photosensitive layer 3c contains a charge generating material, a hole transport material, and a binder resin. The single-layer photosensitive layer may further contain an electron transport material as necessary. The single-layer photosensitive layer 3c may contain an additive as necessary.

Although no particular limitations are placed on the thickness of the single-layer photosensitive layer 3c, the single-layer photosensitive layer 3c has a thickness of preferably at least 5 µm and no greater than 100 µm, and more preferably at least 10 µm and no greater than 50 µm. The single-layer photosensitive member 10 has been described so far with reference to FIGS. 4 to 6.

(Binder Resin)

The binder resin includes the polyarylate resin (PA) described in the first embodiment. The photosensitive layer of the photosensitive member can be favorably formed through use of the polyarylate resin (PA) excellent in solubility in a solvent. Furthermore, as a result of the photosensitive layer containing the polyarylate resin (PA), failure resulting from member contact of the photosensitive member can be prevented and abrasion resistance of the photosensitive member can be increased.

The photosensitive layer may contain only one polyarylate resin (PA) or contain two or more polyarylate resins (PA) as the binder resin. Furthermore, the photosensitive layer may contain only the polyarylate resin (PA) as the binder resin or may further contain a binder resin (also referred to below as an additional binder resin) other than the polyarylate resin (PA). Examples of the additional binder resin include thermoplastic resins (specific examples include polyarylate resins other than the polyarylate resin (PA), polycarbonate resins, styrene-based resins, styrene-butadiene copolymers, styrene-acrylonitrile copolymers, styrene-maleic acid copolymers, styrene-acrylic acid copolymers, acryl copolymers, polyethylene resins, ethylene-vinyl acetate copolymers, chlorinated polyethylene resins, polyvinyl chloride resins, polypropylene resins, ionomers, vinyl chloride-vinyl acetate copolymers, polyester resins, alkyd resins, polyamide resins, polyurethane resins, polysulfone resins, diallyl phthalate resins, ketone resins, polyvinyl butyral resins, polyvinyl acetal resins, and polyether resins), thermosetting resins (specific examples include silicone resins, epoxy resins, phenolic resins, urea resins, melamine resins, and crosslinkable thermosetting resins other than these), and photocurable resins (specific example include epoxy-acrylic acid-based resins and urethane-acrylic acid-based copolymers).

(Hole Transport Material)

Examples of the hole transport material include triphenylamine derivatives, diamine derivatives (e.g., an N,N,N',N'-tetraphenylbenzidine derivative, an N,N,N',N'-tetraphenylphenylenediamine derivative, an N,N,N',N'-tetraphenylnaphtylenediamine derivative, an N,N,N',N'-tetraphenylphenanthrylenediamine derivative, and a di(aminophenylethenyl)benzene derivative), oxadiazole-based compounds (e.g., 2,5-di(4-methylaminophenyl)-1,3,4-oxadiazole), styryl-based compounds (e.g., 9-(4-diethylaminostyryl)anthracene), carbazole-based compounds (e.g., polyvinyl carbazole), organic polysilane compounds, pyrazoline-based compounds (e.g., 1-phenyl-3-(p-dimethylaminophenyl)pyrazoline), hydrazone-based compounds, indole-based compounds, oxazole-based compounds, isoxazole-based compounds, thiazole-based compounds, thiadiazole-based compounds, imidazole-based compounds, pyrazole-based compounds, and triazole-based compounds. The photosensitive layer may contain one hole transport material or two or more hole transport materials.

Preferable examples of the hole transport material include compounds represented by formulas (19), (20), (21), and

(22) (also referred to below as hole transport materials (19), (20), (21), and (22), respectively). As a result of the photosensitive layer containing the hole transport material (19), (20), (21), or (22) together with the polyarylate resin (PA), the photosensitive layer can be further favorably formed, failure resulting from member contact of the photosensitive member can be further prevented, and the photosensitive member can have further increased abrasion resistance.

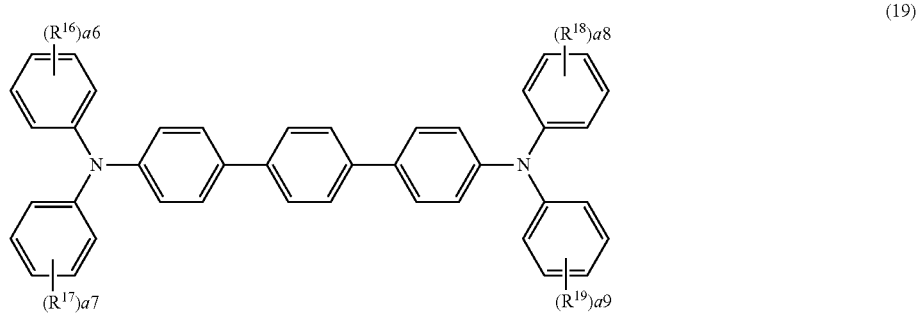

(19)

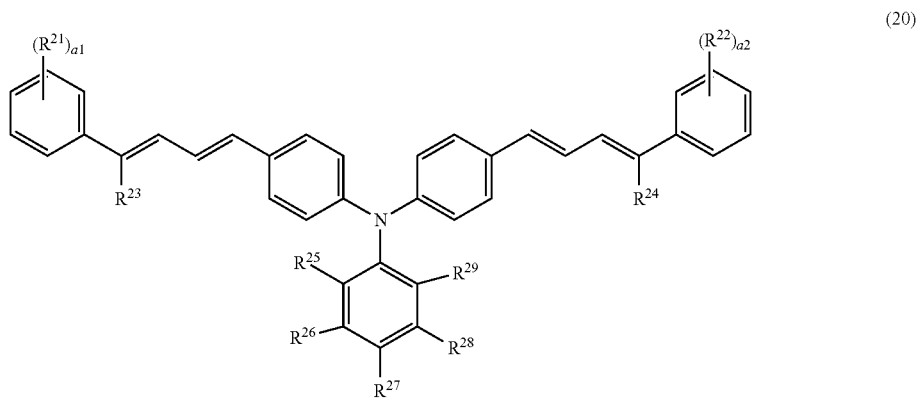

(20)

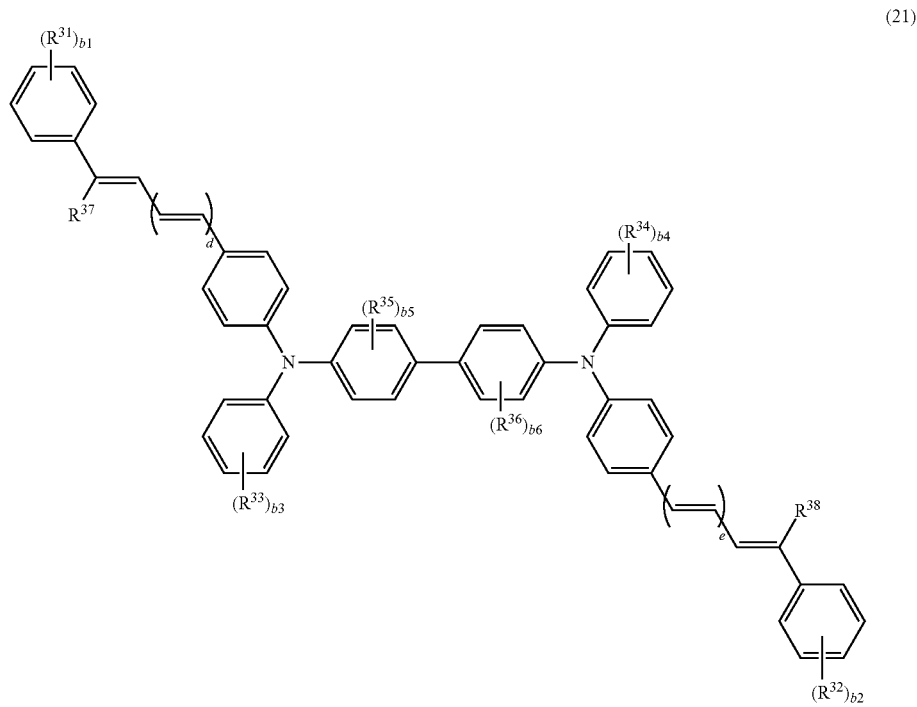

(21)

-continued

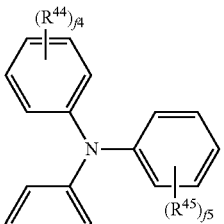
(22)

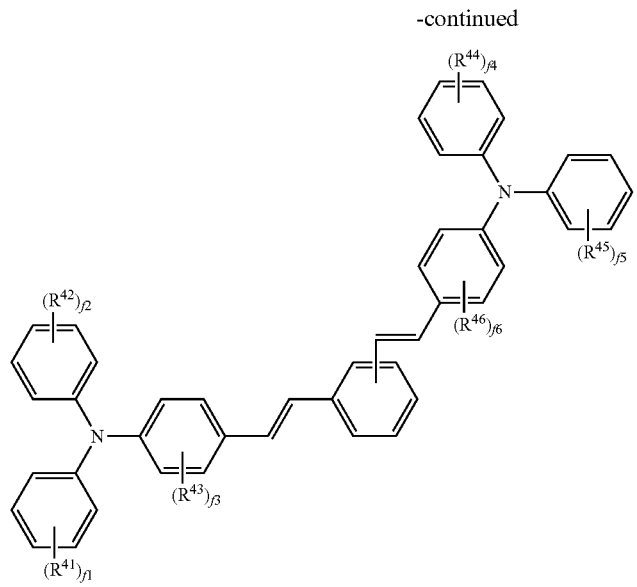

In formula (19), $R^{16}$, $R^{17}$, $R^{18}$, and $R^{19}$ each represent, independently of one another, an alkyl group with a carbon number of at least 1 and no greater than 6 or an alkoxy group with a carbon number of at least 1 and no greater than 6. a6, a7, a8, and a9 each represent, independently of one another, an integer of at least 0 and no greater than 5.

In formula (19), where a6 represents an integer of at least 2 and no greater than 5, the chemical groups $R^{16}$ may represent the same group as each other or represent groups different from each other. Where a7 represents an integer of at least 2 and no greater than 5, the chemical groups $R^{17}$ may represent the same group as each other or represent groups different from each other. Where a8 represents an integer of at least 2 and no greater than 5, the chemical groups $R^{18}$ may represent the same group as each other or represent groups different from each other. Where a9 represents an integer of at least 2 and no greater than 5, the chemical groups $R^{19}$ may represent the same group as each other or represent groups different from each other.

In formula (19), $R^{16}$, $R^{17}$, $R^{18}$, and $R^{19}$ each preferably represent, independently of one another, an alkyl group with a carbon number of at least 1 and no greater than 3, and more preferably a methyl group or an ethyl group. a6, a7, a8, and a9 each preferably represent, independently of one another, an integer of at least 1 and no greater than 3, and more preferably represent 1.

In formula (20), $R^{21}$ and $R^{22}$ each represent, independently of one another, a phenyl group, an alkyl group with a carbon number of at least 1 and no greater than 8, or an alkoxy group with a carbon number of at least 1 and no greater than 8. $R^{23}$, $R^{24}$, $R^{25}$, $R^{26}$, $R^{27}$, $R^{28}$, and $R^{29}$ each represent, independently of one another, a hydrogen atom, an alkyl group with a carbon number of at least 1 and no greater than 8, a phenyl group optionally substituted with an alkyl group with a carbon number of at least 1 and no greater than 8, or an alkoxy group with a carbon number of at least 1 and no greater than 8. Any adjacent two chemical groups among $R^{25}$, $R^{26}$, $R^{27}$, $R^{28}$, and $R^{29}$ may be bonded to form a ring. a1 and a2 each represent, independently of one another, an integer of at least 0 and no greater than 5.

In formula (20), where a1 represents an integer of at least 2 and no greater than 5, the chemical groups $R^{21}$ may represent the same group as each other or represent groups different from each other. Where a2 represents an integer of at least 2 and no greater than 5, the chemical groups $R^{22}$ may represent the same group as each other or represent groups different from each other.

In formula (20), $R^{21}$ and $R^{22}$ each represent, independently of one another, preferably an alkyl group with a carbon number of at least 1 and no greater than 8, more preferably an alkyl group with a carbon number of at least 1 and no greater than 3, and further preferably a methyl group.

In formula (20), preferably, $R^{23}$ and $R^{24}$ each represent, independently of one another, a hydrogen atom or a phenyl group optionally substituted with an alkyl group with a carbon number of at least 1 and no greater than 8. The phenyl group optionally substituted with an alkyl group with a carbon number of at least 1 and no greater than 8 and represented by $R^{23}$ and $R^{24}$ is preferably a phenyl group substituted with an alkyl group with a carbon number of at least 1 and no greater than 8, more preferably a phenyl group substituted with an alkyl group with a carbon number of at least 1 and no greater than 3, further preferably a methylphenyl group, and particularly preferably a 4-methylphenyl group.

In formula (20), preferably, $R^{25}$ to $R^{29}$ each represent, independently of one another, a hydrogen atom or an alkoxy group with a carbon number of at least 1 and no greater than 8. The alkoxy group with a carbon number of at least 1 and no greater than 8 represented by $R^{25}$ to $R^{29}$ is preferably an alkoxy group with a carbon number of at least 1 and no greater than 3, and more preferably a methoxy group or an ethoxy group. Where any adjacent two chemical groups among $R^{25}$ to $R^{29}$ are bonded to form a ring, the ring and a phenyl group to which the adjacent two chemical groups among $R^{25}$ to $R^{29}$ are bonded are fused to form a fused bi-cyclic group. In this case, the fused portion of the ring and the phenyl group may include a double bond. Where any adjacent two chemical groups among $R^{25}$ to $R^{29}$ are bonded to form a ring, the ring is preferably a cycloalkane with a carbon number of at least 5 and no greater than 7, and more preferably cyclohexane.

In formula (20), preferably, a1 and a2 each represent, independently of one another, 0 or 1.

In formula (21), $R^{31}$, $R^{32}$, $R^{33}$, $R^{34}$, $R^{35}$, and $R^{36}$ each represent, independently of one another, a phenyl group or an alkyl group with a carbon number of at least 1 and no greater than 8. $R^{37}$ and $R^{38}$ each represent, independently of one another, a hydrogen atom, a phenyl group, or an alkyl group with a carbon number of at least 1 and no greater than 8. b1, b2, b3, and b4 each represent, independently of one another, an integer of at least 0 and no greater than 5. b5 and b6 each represent, independently of one another, an integer of at least 0 and no greater than 4. d and e each represent, independently of one another, 0 or 1.

In formula (21), where b1 represents an integer of at least 2 and no greater than 5, the chemical groups $R^{31}$ may represent the same group as each other or represent groups different from each other. Where b2 represents an integer of at least 2 and no greater than 5, the chemical groups $R^{32}$ may represent the same group as each other or represent groups different from each other. Where b3 represents an integer of at least 2 and no greater than 5, the chemical groups $R^{33}$ may represent the same group as each other or represent groups different from each other. Where b4 represents an integer of at least 2 and no greater than 5, the chemical groups $R^{34}$ may represent the same group as each other or represent groups different from each other. Where b5 represents an integer of at least 2 and no greater than 4, the chemical groups $R^{35}$ may represent the same group as each other or represent groups different from each other. Where b6 represents an integer of at least 2 and no greater than 4, the chemical groups $R^{36}$ may represent the same group as each other or represent groups different from each other.

In formula (21), $R^{31}$ to $R^{36}$ each represent, independently of one another, preferably an alkyl group with a carbon number of at least 1 and no greater than 8, more preferably an alkyl group with a carbon number of at least 1 and no greater than 3, and further preferably a methyl group or an ethyl group. Each of $R^{37}$ and $R^{38}$ preferably represents a hydrogen atom. Preferably, b1, b2, b3, and b4 each represent, independently of one another, an integer of at least 0 and no greater than 2. Preferably, b5 and b6 each represent 0.

In formula (22), $R^{41}$, $R^{42}$, $R^{43}$, $R^{44}$, $R^{45}$, and $R^{46}$ each represent, independently of one another, a phenyl group, an alkyl group with a carbon number of at least 1 and no greater than 8, or an alkoxy group with a carbon number of at least 1 and no greater than 8. f1, f2, f4, and f5 each represent, independently of one another, an integer of at least 0 and no greater than 5. f3 and f6 each represent, independently of one another, an integer of at least 0 and no greater than 4.

In formula (22), where f1 represents an integer of at least 2 and no greater than 5, the chemical groups $R^{41}$ may represent the same group as each other or represent groups different from each other. Where f2 represents an integer of at least 2 and no greater than 5, the chemical groups $R^{42}$ may represent the same group as each other or represent groups different from each other. Where f4 represents an integer of at least 2 and no greater than 5, the chemical groups $R^{44}$ may represent the same group as each other or represent groups different from each other. Where f5 represents an integer of at least 2 and no greater than 5, the chemical groups $R^{45}$ may represent the same group as each other or represent groups different from each other. Where f3 represents an integer of at least 2 and no greater than 4, the chemical groups $R^{43}$ may represent the same group as each other or represent groups different from each other. Where f6 represents an integer of at least 2 and no greater than 4, the chemical groups $R^{46}$ may represent the same group as each other or represent groups different from each other.

In formula (22), $R^{41}$ to $R^{46}$ each represent, independently of one another, preferably an alkyl group with a carbon number of at least 1 and no greater than 8, more preferably an alkyl group with a carbon number of at least 1 and no greater than 3, and further preferably a methyl group or an ethyl group. Preferably, f1, f2, f4, and f5 each represent, independently of one another, an integer of at least 0 and no greater than 2. Preferably, f3 and f6 each represent 0. A diphenylaminophenylethenyl group with $R^{44}$, $R^{45}$, and $R^{46}$ is preferably bonded at a para position of the phenyl group to a diphenylaminophenylethenyl group with $R^{41}$, $R^{42}$, and $R^{43}$.

More preferable examples of the hole transport material include compounds represented by formulas (HTM-1) to (HTM-7) (also referred to below as hole transport materials (HTM-1) to (HTM-7), respectively)).

(HTM-1)

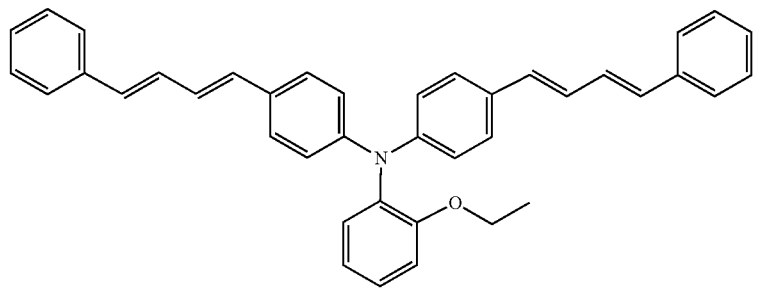

-continued
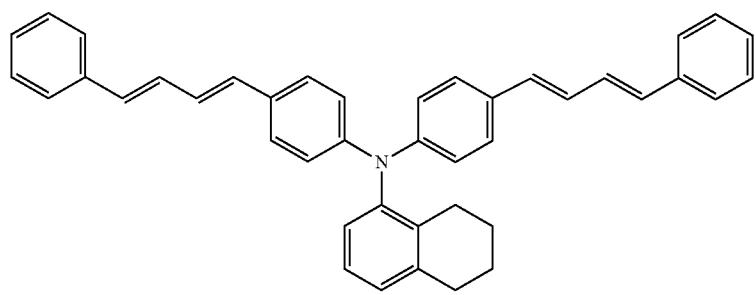
(HTM-2)
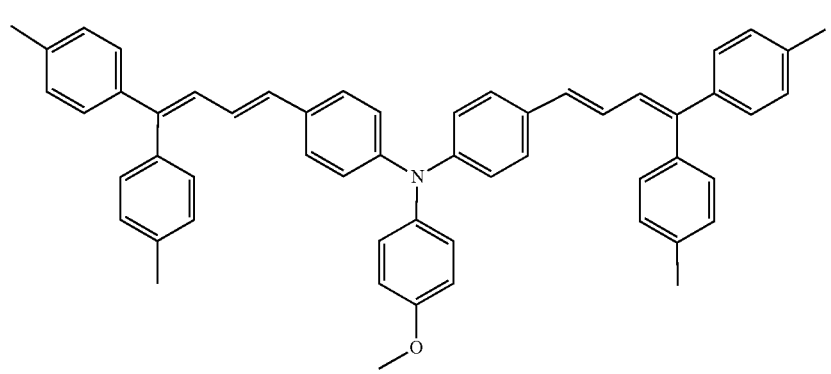
(HTM-3)
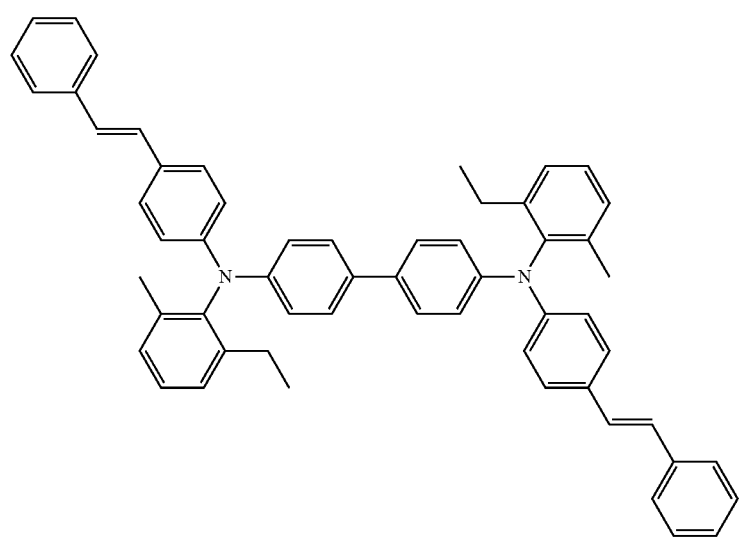
(HTM-4)

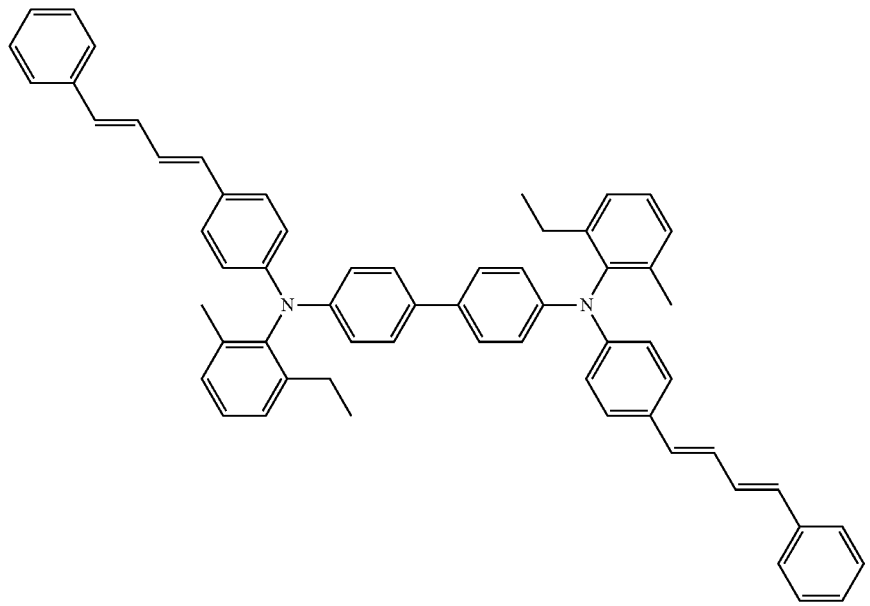

(HTM-5)

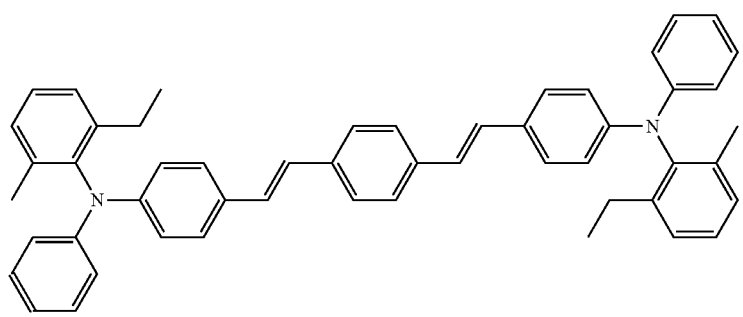

(HTM-6)

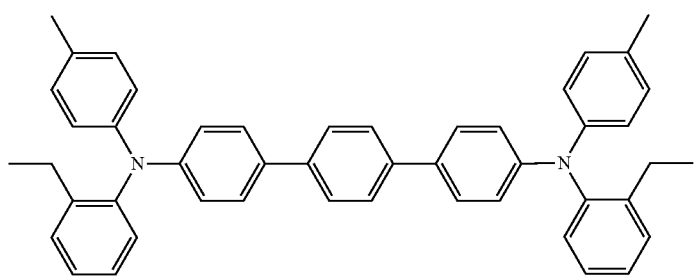

(HTM-7)

In a case of the photosensitive member being a multi-layer photosensitive member, the amount of the hole transport material is preferably at least 10 parts by mass and no greater than 200 parts by mass relative to 100 parts by mass of the binder resin, more preferably at least 20 parts by mass and no greater than 100 parts by mass, and further preferably at least 40 parts by mass and no greater than 60 parts by mass. In a case of the photosensitive member being a single-layer photosensitive member, the amount of the hole transport material is preferably at least 50 parts by mass and no greater than 200 parts by mass relative to 100 parts by mass of the binder resin, and more preferably at least 50 parts by mass and no greater than 70 parts by mass.

(Charge Generating Material)

Examples of the charge generating material include a phthalocyanine-based pigment, a perylene-based pigment, a bisazo pigment, a tris-azo pigment, a dithioketopyrrolopyrrole pigment, a metal-free naphthalocyanine pigment, a metal naphthalocyanine pigment, a squaraine pigment, an indigo pigment, an azulenium pigment, a cyanine pigment, powders of inorganic photoconductive materials (e.g., selenium, selenium-tellurium, selenium-arsenic, cadmium sulfide, and amorphous silicon), a pyrylium pigment, an anthanthrone-based pigment, a triphenylmethane-based pigment, a threne-based pigment, a toluidine-based pigment, a pyrazoline-based pigment, and a quinacridone-based pigment. The photosensitive layer may contain one charge generating material or contain two or more charge generating materials.

The phthalocyanine-based pigment is a pigment with a phthalocyanine structure. Examples of the phthalocyanine-based pigment include metal-free phthalocyanine and metal phthalocyanines. Examples of the metal phthalocyanines include titanyl phthalocyanine, hydroxygallium phthalocyanine, and chlorogallium phthalocyanine. Metal-free phthalocyanine is represented by formula (CGM-1). Titanyl phthalocyanine is represented by formula (CGM-2).

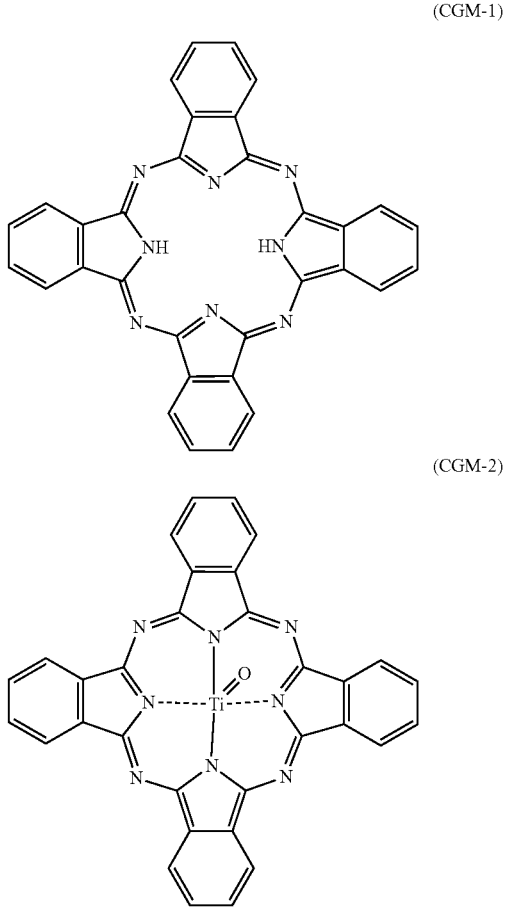

(CGM-1)

(CGM-2)

The phthalocyanine-based pigment may be crystalline or non-crystalline. Examples of crystalline metal-free phthalocyanine include metal-free phthalocyanine having X-form crystal structure (also referred to below as X-form metal-free phthalocyanine). Examples of crystalline titanyl phthalocyanine include titanyl phthalocyanine having any of α-form crystal structure, a β-form crystal structure, and Y-form crystal structure (also referred to below as α-from titanyl phthalocyanine, β-form titanyl phthalocyanine, and Y-form titanyl phthalocyanine, respectively).

For example, in a digital optical image forming apparatus (e.g., a laser beam printer or facsimile machine that uses a light source such as a semiconductor laser), a photosensitive member that is sensitive to light in a wavelength range of at least 700 nm is preferably used. In terms of high quantum yield in a wavelength range of at least 700 nm, the charge generating material is preferably a phthalocyanine-based pigment, more preferably metal-free phthalocyanine or titanyl phthalocyanine, further preferably titanyl phthalocyanine, and particularly preferably Y-form titanyl phthalocyanine.

Y-form titanyl phthalocyanine exhibits a main peak for example at a Bragg angle) (2θ±0.2°) of 27.2° in a CuKα characteristic X-ray diffraction spectrum. The term main peak in the CuKα characteristic X-ray diffraction spectrum refers to a most intense or second most intense peak within a range of Bragg angles (2θ±0.2°) from 3° to 40°. Y-form titanyl phthalocyanine has no peaks at 26.2° C. in the CuKα characteristic X-ray diffraction spectrum.

The CuKα characteristic X-ray diffraction spectrum can be measured by the following methods, for example. A sample (titanyl phthalocyanine) is loaded into a sample holder of an X-ray diffraction spectrometer (e.g., "RINT (registered Japanese trademark) 1100", product of Rigaku Corporation) and an X-ray diffraction spectrum is plotted using a Cu X-ray tube under conditions of a tube voltage of 40 kV, a tube current of 30 mA, and CuKα characteristic X-rays with a wavelength of 1.542 Å. The measurement range (2θ) is for example from 3° to 40° (start angle: 3°, stop angle 40°), and the scanning speed is for example 10°/min. A main peak in the plotted X-ray diffraction spectrum is determined, and a Bragg angle of the main peak is read from the X-ray diffraction spectrum.

In a case of the photosensitive member being a multi-layer photosensitive member, the amount of the charge generating material is preferably at least 10 parts by mass and no greater than 300 parts by mass relative to 100 parts by mass of the base resin, and more preferably at least 100 parts by mass and no greater than 200 parts by mass. In a case of the photosensitive member being a single-layer photosensitive member, the amount of the charge generating material is preferably at least 0.1 parts by mass and no greater than 50 parts by mass relative to 100 parts by mass of the binder resin, and more preferably at least 0.5 parts by mass and no greater than 30 parts by mass.

(Base Resin)

Examples of the base resin contained in the charge generating layer are the same as those listed as the examples of the additional binder resin contained in the charge transport layer.

(Additive)

Examples of the additive include an ultraviolet absorbing agent, an antioxidant, a radical scavenger, a singlet quencher, a softener, a surface modifier, an extender, a thickener, a dispersion stabilizer, a wax, a donor, a surfactant, a plasticizer, a sensitizer, an electron acceptor compound, and a leveling agent. A preferable antioxidant is a hindered phenol antioxidant, and more preferable antioxidant is pentaerythritol tetrakis(3-(3,5-di-tert-butyl-4-hydroxyphenyl)propionate).

(Material Combination)

In order to favorably form the photosensitive layer, prevent failure resulting from member contact of the photosensitive member, and increase abrasion resistance of the photosensitive member, a combination of the hole transport material and the binder resin is preferably any of Combination Nos. a-1 to a-14 and b-1 to b-28 shown in Table 3 and Combination Nos. c-1 to c-49 shown in Table 4. For the same purposes as above, it is preferable that the combination of the hole transport material and the binder resin is any of Combination Nos. a-1 to a-14 and b-1 to b-28 shown in Table 3 and Combination Nos. c-1 to c-49 shown in Table 4 and the charge generating material is Y-form titanyl phthalocyanin. For the same purposes as above, it is more preferable that the combination of the hole transport material and the binder resin is any of Combination Nos. a-1 to a-14 and b-1 to b-28 shown in Table 3 and Combination Nos. c-1 to c-49 shown in Table 4 and the additive added to the charge transport material is a hindered phenol antioxidant (more preferably, pentaerythritol tetrakis(3-(3,5-di-tert-butyl-4-hydroxyphenyl)propionate)). In Tables 3 to 4, "No." indicates "Combination No.", "HTM" indicates "hole transport material", and "Resin" indicates "polyarylate resin" that is a binder resin. Polyarylate resins A to G in Table 4 will be described in detail in Examples.

TABLE 3

| No. | HTM | Resin |
| --- | --- | --- |
| a-1 | HTM-1 | PA-1 |
| a-2 | HTM-2 | PA-1 |
| a-3 | HTM-3 | PA-1 |
| a-4 | HTM-4 | PA-1 |
| a-5 | HTM-5 | PA-1 |
| a-6 | HTM-6 | PA-1 |
| a-7 | HTM-7 | PA-1 |
| a-8 | HTM-1 | PA-2 |
| a-9 | HTM-2 | PA-2 |
| a-10 | HTM-3 | PA-2 |
| a-11 | HTM-4 | PA-2 |
| a-12 | HTM-5 | PA-2 |
| a-13 | HTM-6 | PA-2 |
| a-14 | HTM-7 | PA-2 |
| b-1 | HTM-1 | PA-a |
| b-2 | HTM-2 | PA-a |
| b-3 | HTM-3 | PA-a |
| b-4 | HTM-4 | PA-a |
| b-5 | HTM-5 | PA-a |
| b-6 | HTM-6 | PA-a |
| b-7 | HTM-7 | PA-a |
| b-8 | HTM-1 | PA-b |
| b-9 | HTM-2 | PA-b |
| b-10 | HTM-3 | PA-b |
| b-11 | HTM-4 | PA-b |
| b-12 | HTM-5 | PA-b |
| b-13 | HTM-6 | PA-b |
| b-14 | HTM-7 | PA-b |
| b-15 | HTM-1 | PA-c |
| b-16 | HTM-2 | PA-c |
| b-17 | HTM-3 | PA-c |
| b-18 | HTM-4 | PA-c |
| b-19 | HTM-5 | PA-c |
| b-20 | HTM-6 | PA-c |
| b-21 | HTM-7 | PA-c |
| b-22 | HTM-1 | PA-d |
| b-23 | HTM-2 | PA-d |
| b-24 | HTM-3 | PA-d |
| b-25 | HTM-4 | PA-d |
| b-26 | HTM-5 | PA-d |
| b-27 | HTM-6 | PA-d |
| b-28 | HTM-7 | PA-d |

TABLE 4

| No. | HTM | Resin |
| --- | --- | --- |
| c-1 | HTM-1 | A |
| c-2 | HTM-2 | A |
| c-3 | HTM-3 | A |
| c-4 | HTM-4 | A |
| c-5 | HTM-5 | A |
| c-6 | HTM-6 | A |
| c-7 | HTM-7 | A |
| c-8 | HTM-1 | B |
| c-9 | HTM-2 | B |
| c-10 | HTM-3 | B |
| c-11 | HTM-4 | B |
| c-12 | HTM-5 | B |
| c-13 | HTM-6 | B |
| c-14 | HTM-7 | B |
| c-15 | HTM-1 | C |
| c-16 | HTM-2 | C |
| c-17 | HTM-3 | C |
| c-18 | HTM-4 | C |
| c-19 | HTM-5 | C |
| c-20 | HTM-6 | C |
| c-21 | HTM-7 | C |
| c-22 | HTM-1 | D |
| c-23 | HTM-2 | D |
| c-24 | HTM-3 | D |
| c-25 | HTM-4 | D |
| c-26 | HTM-5 | D |
| c-27 | HTM-6 | D |
| c-28 | HTM-7 | D |
| c-29 | HTM-1 | E |
| c-30 | HTM-2 | E |
| c-31 | HTM-3 | E |
| c-32 | HTM-4 | E |
| c-33 | HTM-5 | E |
| c-34 | HTM-6 | E |
| c-35 | HTM-7 | E |
| c-36 | HTM-1 | F |
| c-37 | HTM-2 | F |
| c-38 | HTM-3 | F |
| c-39 | HTM-4 | F |
| c-40 | HTM-5 | F |
| c-41 | HTM-6 | F |
| c-42 | HTM-7 | F |
| c-43 | HTM-1 | G |
| c-44 | HTM-2 | G |
| c-45 | HTM-3 | G |
| c-46 | HTM-4 | G |
| c-47 | HTM-5 | G |
| c-48 | HTM-6 | G |
| c-49 | HTM-7 | G |

(Conductive Substrate)

No particular limitations are placed on the conductive substrate so long as at least a surface portion thereof is made from a conductive material. An example of the conductive substrate is a conductive substrate made from a conductive material. Another example of the conductive substrate is a conductive substrate covered with a conductive material. Examples of the conductive material include aluminum, iron, copper, tin, platinum, silver, vanadium, molybdenum, chromium, cadmium, titanium, nickel, palladium, indium, stainless steel, and brass. Among the conductive materials listed above, aluminum or an aluminum alloy is preferable in terms of favorable charge mobility from the photosensitive layer to the conductive substrate.

The conductive substrate may have any shape and the shape thereof can be selected as appropriate according to the configuration of an image forming apparatus in which the conductive substrate is to be used. The conductive substrate has a sheet shape or a drum shape, for example. The thickness of the conductive substrate is selected as appropriate according to the shape of the conductive substrate.

(Intermediate Layer)

The intermediate layer (undercoat layer) contains for example inorganic particles and a resin (intermediate layer resin) for intermediate layer use. Provision of the intermediate layer may facilitate flow of electric current generated when the photosensitive member is exposed to light and inhibit increasing resistance, while also maintaining insulation to a sufficient degree so as to inhibit leakage of electric current from occurring.

Examples of the inorganic particles include particles of metals (e.g., aluminum, iron, and copper), particles of metal oxides (e.g., titanium oxide, alumina, zirconium oxide, tin oxide, and zinc oxide), and particles of non-metal oxides (e.g., silica).

Examples of the intermediate layer resin are the same as those listed as the examples of the additional binder resin as described previously. In order to favorably form the intermediate layer and the photosensitive layer, the intermediate layer resin is preferably different from the binder resin contained in the photosensitive layer. The intermediate layer may contain an additive. Examples of the additive contained in the intermediate layer are the same as those listed as the examples of the additive contained in the photosensitive layer.

(Photosensitive Member Production Method)

An example of a multi-layer photosensitive member production method and an example of a single-layer photosensitive member production method will be described that each are a photosensitive member production method.

The multi-layer photosensitive member production method includes a charge generating layer formation process and a charge transport layer formation process, for example. In the charge generating layer formation process, an application liquid (also referred to below as application liquid for charge generating layer formation) for forming a charge generating layer is prepared first. The application liquid for charge generating layer formation is applied onto a conductive substrate. Next, at least a portion of a solvent contained in the applied application liquid for charge generating layer formation is removed to form a charge generating layer. The application liquid for charge generating layer formation contains a charge generating material, a base resin, and the solvent, for example. The application liquid for charge generating layer formation such as above is prepared by dissolving or dispersing the charge generating material and the base resin in the solvent. The application liquid for charge generating layer formation may further contain an additive as necessary.

In the charge transport layer formation process, an application liquid (also referred to below as application liquid for charge transport layer formation) for forming a charge transport layer is prepared first. The application liquid for charge transport layer formation is applied onto the charge generating layer. Next, at least a portion of a solvent contained in the applied application liquid for charge transport layer formation is removed to form a charge transport layer. The application liquid for charge transport layer formation contains a hole transport material, a binder resin, and the solvent. The application liquid for charge transport layer formation is prepared by dissolving or dispersing the hole transport material and the binder resin in the solvent. The application liquid for charge transport layer formation may further contain an additive as necessary.

The single-layer photosensitive member production method includes a single-layer photosensitive layer formation process, for example. In the single-layer photosensitive layer formation process, an application liquid (also referred to below as application liquid for single-layer photosensitive layer formation) for forming a single-layer photosensitive layer is prepared. The application liquid for single-layer photosensitive layer formation is applied onto a conductive substrate. Next, at least a portion of a solvent contained in the applied application liquid for single-layer photosensitive layer formation is removed to form a single-layer photosensitive layer. The application liquid for single-layer photosensitive layer formation contains a charge generating material, a hole transport material, a binder resin, and the solvent, for example. The application liquid for single-layer photosensitive layer formation is prepared by dissolving or dispersing the charge generating material, the hole transport material, and the binder resin in the solvent. The application liquid for single-layer photosensitive layer formation may further contain either or both an electron transport material and an additive as necessary.

No particular limitations are placed on the respective solvents contained in the application liquid for single-layer photosensitive layer formation, the application liquid for charge generating layer formation, and the application liquid for charge transport layer formation (each also referred to below as application liquid) so long as each component contained in the application liquid can be dissolved or dispersed therein. Examples of the solvents include alcohols (specific examples include methanol, ethanol, isopropanol, and butanol), aliphatic hydrocarbons (specific examples include n-hexane, octane, and cyclohexane), aromatic hydrocarbons (specific examples include benzene, toluene, and xylene), halogenated hydrocarbons (specific examples include dichloromethane, dichloroethane, carbon tetrachloride, and chlorobenzene), ethers (specific examples include dimethyl ether, diethyl ether, tetrahydrofuran, ethylene glycol dimethyl ether, and diethylene glycol dimethyl ether), ketones (specific examples include acetone, methyl ethyl ketone, and cyclohexanone), esters (specific examples include ethyl acetate and methyl acetate), dimethyl formaldehyde, dimethyl formamide, and dimethyl sulfoxide.

The solvent contained in the application liquid for charge transport layer formation preferably differs from the solvent contained in the application liquid for charge generating layer formation. This is because it is preferable that the charge generating layer does not dissolve in the solvent of the application liquid for charge transport layer formation in application of the application liquid for charge transport layer formation onto the charge generating layer.

Each application liquid is prepared by mixing the corresponding components to disperse the components in the corresponding solvent. Mixing or dispersion can for example be performed using a bead mill, a roll mill, a ball mill, an attritor, a paint shaker, or an ultrasonic disperser.

No particular limitations are placed on a method for applying the application liquid so long as the application liquid can be applied uniformly. Examples of the method for applying the application liquid include dip coating, spray coating, spin coating, and bar coating.

Examples of a method for removing at least a portion of the solvent contained in the application liquid include heating, pressure reduction, and a combination of heating and pressure reduction. One specific example of the method involves heat treatment (hot-air drying) using a high-temperature dryer or a reduced pressure dryer. The temperature of the heat treatment is at least 40° C. and no greater than 150° C., for example. The heat treatment is performed for at least 3 minutes and no greater than 120 minutes, for example.

Note that the photosensitive member production method may further include either or both a process of forming an intermediate layer and a process of forming a protective layer as necessary. Any known method can be selected as appropriate as the process of forming an intermediate layer or the process of forming a protective layer.

EXAMPLES

The following provides further specific description of the present disclosure through use of Examples. However, the present disclosure is not limited to the scope of Examples.

<Preparation of Polyarylate Resins A to T>

Polyarylate resins A to G of Examples and polyarylate resins H to T of Comparative Examples were synthesized according to methods described below. The compositions of the respective polyarylate resins A to T are shown in Table 5 below.

TABLE 5

| Monomer | Bisphenol addition rate [%] | | | | | | dicarboxylic acid addition rate [%] | | | Terminator | Molecular weight |
|---|---|---|---|---|---|---|---|---|---|---|---|
| | BisCZ Unit (1-1) | BisB Unit (1-2) | BisC Unit (BisC) | BisZ Unit (BisZ) | BisCE Unit (BisCE) | DHPE Unit (3) | DPEC Unit (2) | TPC Unit (4) | IPC Unit (IPC) | | |
| Resin A | 80 | — | — | — | — | 20 | 65 | 35 | — | DMP | 58,200 |
| Resin B | — | 80 | — | — | — | 20 | 65 | 35 | — | DMP | 61,000 |
| Resin C | 80 | — | — | — | — | 20 | 50 | 50 | — | DMP | 54,200 |
| Resin D | 80 | — | — | — | — | 20 | 35 | 65 | — | DMP | 52,400 |
| Resin E | — | 80 | — | — | — | 20 | 50 | 50 | — | DMP | 65,200 |
| Resin F | 60 | — | — | — | — | 40 | 65 | 35 | — | DMP | 50,900 |
| Resin G | 80 | — | — | — | — | 20 | 65 | 35 | — | PFH | 52,300 |
| Resin H | 50 | — | — | — | — | 50 | 65 | 35 | — | DMP | 58,600 |
| Resin I | 80 | — | — | — | — | 20 | 100 | — | — | DMP | 57,200 |
| Resin J | 60 | — | — | — | — | 40 | 100 | — | — | DMP | 56,600 |
| Resin K | — | 80 | — | — | — | 20 | 100 | — | — | DMP | 61,000 |
| Resin L | — | — | — | 80 | — | 20 | 65 | 35 | — | DMP | Unmeasurable |
| Resin M | — | — | 80 | — | — | 20 | 65 | 35 | — | DMP | 49,900 |
| Resin N | — | 80 | — | — | — | 20 | 50 | 25 | 25 | DMP | 50,800 |
| Resin O | 80 | — | — | — | — | 20 | 25 | 75 | — | DMP | 52,100 |
| Resin P | 100 | — | — | — | — | — | 65 | 35 | — | DMP | 53,500 |
| Resin Q | — | — | — | 100 | — | — | 50 | 30 | 20 | DMP | Unmeasurable |
| Resin R | 80 | — | — | — | — | 20 | 65 | — | 35 | DMP | 48,100 |
| Resin S | — | — | — | — | 70 | 30 | 100 | — | — | DMP | 56,900 |
| Resin T | 80 | — | — | — | — | 20 | — | 100 | — | DMP | 42,300 |

In Table 5, "BisCZ", "BisB", "BisC", "BisZ", "BisCE", "DHPE", "DPEC", "TPC", and "IPC" indicate compounds represented by the following formulas (BisCZ), (BisB), (BisC), (BisZ), (BisCE), (DHPE), (DPEC), (TPC), and (IPC) (also referred to below as compounds (BisCZ), (BisB), (BisC), (BisZ), (BisCE), (DHPE), (DPEC), (TPC), and (IPC), respectively).

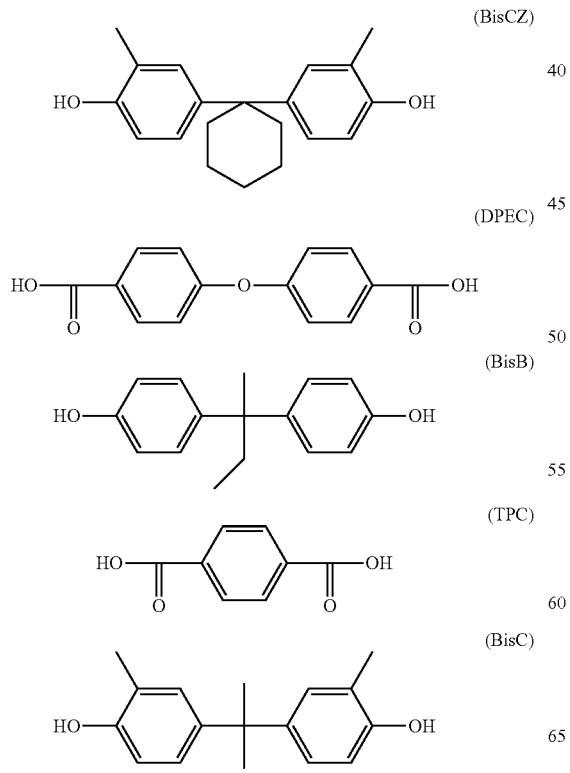

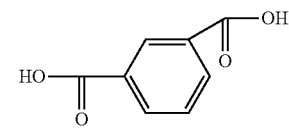

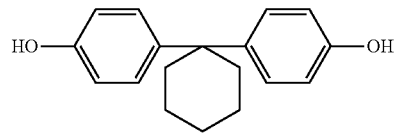

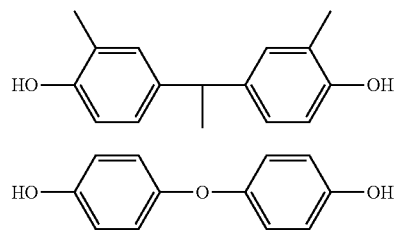

The terms in Table 5 are as follows.

Monomer: monomer used for synthesis of corresponding polyarylate resin

Formation unit: repeating unit formed from corresponding monomer

Resin: polyarylate resin

Bisphenol addition rate: percentage (unit: %) of amount (unit:mol) of corresponding bisphenol monomer added relative to total amount (unit:mol) of bisphenol monomer(s) added in synthesis of corresponding polyarylate resin Dicarboxylic acid addition rate: percentage (unit: %) of amount (unit:mol) of corresponding dicarboxylic acid monomer(s) added relative to total amount (unit:mol) of dicarboxylic acid monomers added in synthesis of corresponding polyarylate resin Molecular weight: viscosity average molecular weight
Unit: repeating unit
Unit (BisC): repeating unit derived from compound (BisC)
Unit (BisZ): repeating unit derived from compound (BisZ)
Unit (BisCE): repeating unit derived from compound (BisCE)
Unit (IPC): repeating unit derived from compound (IPC)
DMP: 2,6-dimethylphenol
PFH: 1H, 1H-perfluoro-1-heptanol
-: no corresponding monomer being used
Unmeasurable: measurement of viscosity average molecular weight being unable due to corresponding polyarylate resin not dissolving in solvent for viscosity molecular weight measurement (Synthesis of Polyarylate Resin A)

A three-necked flask equipped with a thermometer, a three-way cock, and a dropping funnel was used as a reaction vessel. The compound (BisCZ) (32.8 mmol) being a monomer, the compound (DHPE) (8.2 mmol) being a monomer, 2.6-dimethylphenol (0.413 mmol) being a terminator, sodium hydroxide (98 mmol), and benzyltributylammonium chloride (0.384 mmol) were added into the reaction vessel. The reaction vessel was purged with an argon gas. Water (300 mL) was added to the contents of the reaction vessel. The contents of the reaction vessel were stirred at 50° C. for 1 hours. The contents of the reaction vessel were cooled to 10° C., thereby yielding an alkaline aqueous solution S-A.

Next, dicarboxylic acid dichloride (20.8 mmol) of the compound (DPEC) being a monomer and dicarboxylic acid dichloride (11.2 mmol) of the compound (TPC) being a monomer were dissolved in chloroform (150 mL). This yielded a chloroform solution S-B.

The chloroform solution S-B was gradually dripped into the alkaline aqueous solution S-A over 110 minutes using a dropping funnel. The contents of the reaction vessel were stirred for 4 hours while the temperature (liquid temperature) of the contents of the reaction vessel was adjusted to 15±5° C. to allow a polymerization reaction to proceed. The upper layer (water layer) of the contents of the reaction vessel was removed using a decant, thereby obtaining an organic layer. Next, ion exchange water (400 mL) was added into a conical flask. The resultant organic layer was additionally added into the conical flask. Chloroform (400 mL) and acetic acid (2 mL) were additionally added into the conical flask. The contents of the conical flask were stirred at room temperature (25° C.) for 30 minutes. The upper layer (water layer) of the contents of the reaction vessel was removed using a decant, thereby obtaining an organic layer. The obtained organic layer was washed with ion exchange water (1 L) using a separatory funnel. The washing with ion exchange water was repeated 5 times to obtain a washed organic layer. Next, the washed organic layer was filtered to obtain a filtrate. The resultant filtrate was gradually dripped into methanol (1 L), thereby yielding a precipitate. The precipitate was taken out by filtration. The resultant precipitate was vacuum dried at a temperature of 70° C. for 12 hours. As a result, the polyarylate resin A was obtained.

(Synthesis of Polyarylate Resins B to T)

The polyarylate resins B to T were synthesized according to the same method as that for synthesis of the polyarylate resin A in all aspects other than use of the monomers shown in Table 5 at respective addition rates shown in Table 5. Note that the amount of each bisphenol monomer added was set so that the total amount of the corresponding bisphenol monomers was 41.0 mmol and in a corresponding bisphenol addition rate shown in Table 5. For example, in synthesis of the polyarylate resin E, the amount of the compound (BisB) added was 32.8 mmol (=41.0×80/100) and the amount of the compound (DHPE) added was 8.2 mmol (=41.0×20/100). Furthermore, the amount of each dicarboxylic acid monomer added was set so that the total amount of the corresponding dicarboxylic acid monomers was 32.0 mmol and in a corresponding bisphenol addition rate shown in Table 5. For example, in synthesis of the polyarylate resin E, the amount of the compound (DPEC) added was 16.0 mmol (=32.0×50/100) and the amount of the compound (TPC) added was 16.0 mmol (=32.0×50/100).

Figure 7:
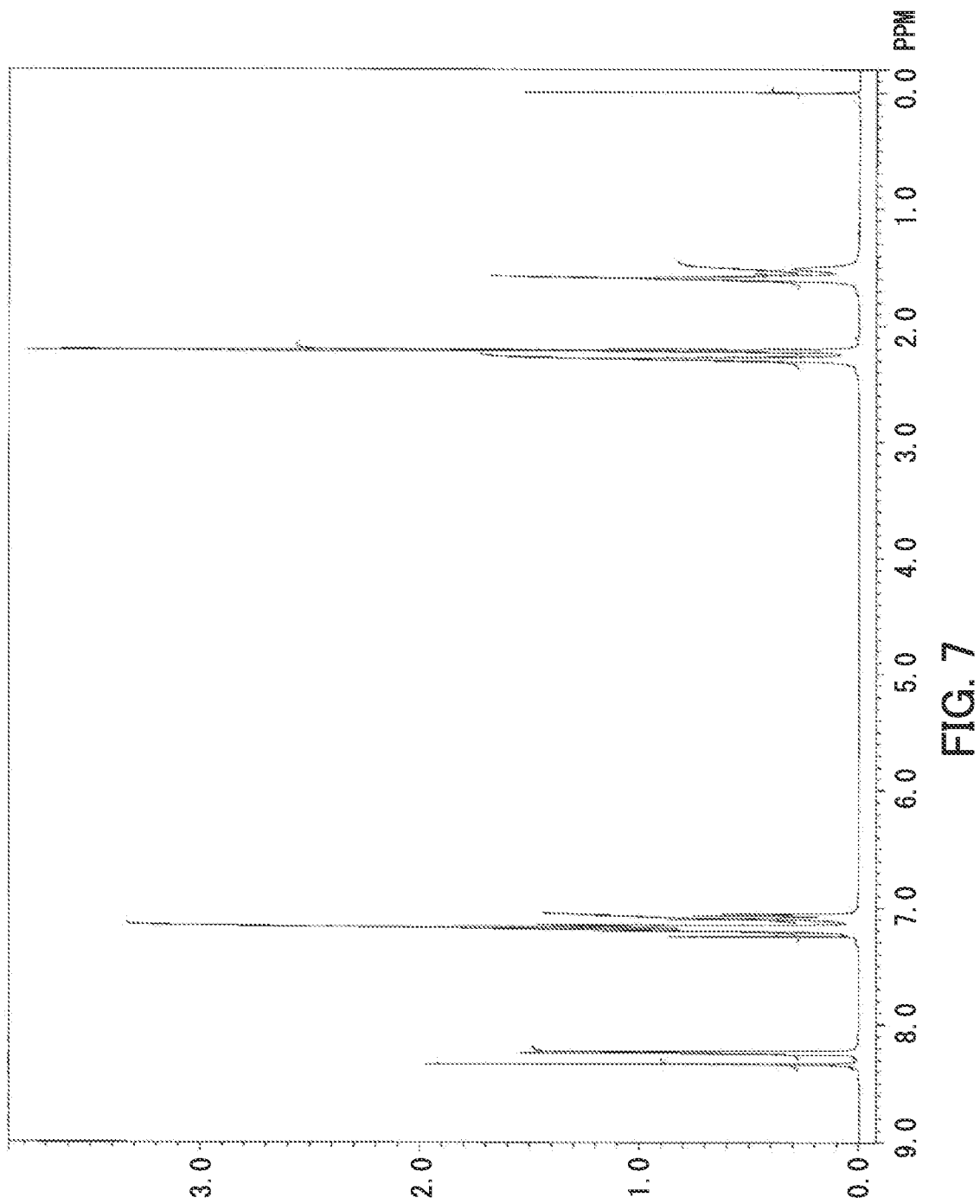
FIG. 7 is a $^1$H-NMR spectrum of a polyarylate resin A.

Each $^1$H-NMR spectrum of the resultant polyarylate resins A to T was plotted using a proton nuclear magnetic resonance spectrometer (product of JEOL Ltd., 600 MHz). Deuterated chloroform was used as a solvent. Tetramethylsilane (TMS) was used as an internal standard sample. The $^1$H-NMR spectrum of the polyarylate resin A is shown in FIG. 7 as a typical example of the polyarylate resins A to T. It was confirmed from the chemical shift read from the $^1$H-NMR spectrum that the polyarylate resin A have been obtained. With respect to the polyarylate resins B to T, it was also confirmed by the same method as above that the polyarylate resins B to T have been obtained.

(Viscosity Average Molecular Weight Measurement)

The viscosity average molecular weight of each polyarylate resin was measured in accordance with the Japanese Industrial Standards (JIS) K7252-1:2016. The measured viscosity average molecular weights are shown in Table 5.

<Multi-Layer Photosensitive Member Production>

(Production of Multi-Layer Photosensitive Member (A-1))

First, an intermediate layer was formed. Surface treated titanium oxide ("test sample SMT-A", product of Tayca Corporation, number average primary particle diameter 10 nm) was prepared. SMT-A was a substance obtained in a manner that titanium oxide was surface treated with alumina and silica and the surface treated titanium oxide was further surface treated with methyl hydrogen polysiloxane under wet dispersion. Next, 2 parts by mass of SMT-A, 1 part by mass of a polyamide resin ("AMILAN (registered Japanese trademark) CM8000", product of Toray Industries, Inc., quaternary copolymerized polyamide resin of polyamide 6, polyamide 12, polyamide 66, and polyamide 610), 10 parts by mass of methanol, 1 part by mass of butanol, and 1 part by mass of toluene were mixed for 5 hours using a bead mill, thereby yielding an application liquid for intermediate layer formation. The resultant application liquid for intermediate layer formation was filtered using a filter with a pore size of 5 μm. Thereafter, the application liquid for intermediate layer formation was applied onto the surface of a conductive substrate by dip coating. The conductive substrate used was a drum-shaped aluminum support. Subsequently, the applied application liquid for intermediate layer formation was dried at 130° C. for 30 minutes, thereby forming an intermediate layer (film thickness: 2 μm) on the conductive substrate.

Next, a charge generating layer was formed. Specifically, 1.5 parts by mass of Y-form titanyl phthalocyanine being a charge generating material, 1.0 parts by mass of a polyvinyl acetal resin ("S-LEC BX-5", product of SEKISUI CHEMICAL CO., LTD.) being a base resin, 40.0 parts by mass of propylene glycol monomethyl ether, and 40.0 parts by mass of tetrahydrofuran were mixed for 2 hours using a bead mill, thereby yielding an application liquid for charge generating layer formation. The resultant application liquid for charge generating layer formation was filtered using a filter with a pore size of 3 μm. The resultant filtrate was applied onto the intermediate layer by dip coating and dried at 50° C. for 5 minutes. Through the above processes, a charge generating layer (film thickness: 0.3 μm) was formed on the intermediate layer.

Next, a charge transport layer was formed. Specifically, 50 parts by mass of the hole transport material (HTM-1), 100 parts by mass of the polyarylate resin A being a binder resin, 2 parts by mass of a hindered phenol antioxidant ("IRGANOX (registered Japanese trademark) 1010", product of BASF, contents: pentaerythritol tetrakis(3-(3,5-di-tert-butyl-4-hydroxyphenyl)propionate), 595 parts by mass of tetrahydrofuran, and 105 parts by mass of toluene were mixed, thereby yielding an application liquid for charge transport layer formation. The application liquid for charge transport layer formation was applied onto the charge generating layer by dip coating, and dried at 120° C. for 40 minutes. A charge transport layer (film thickness: 20 μm) was formed on the charge generating layer as described above, thereby obtaining a multi-layer photosensitive member (A-1). The multi-layer photosensitive member (A-1) included the intermediate layer on the conductive substrate, the charge generating layer on the intermediate layer, and the charge transport layer on the charge generating layer.

(Production of Multi-layer Photosensitive Members (A-2) to (A-14) and (B-1) to (B-13))

Multi-layer photosensitive members (A-2) to (A-14) and (B-1) to (B-13) were produced according to the same method as that for producing the multi-layer photosensitive member (A-1) in all aspects other than use of the hole transport materials and the polyarylate resins shown in Table 7.

<Evaluation of Solubility in Solvent>

With respect to each of the polyarylate resins A to T, 3 g of the polyarylate resin and tetrahydrofuran in an amount that made the concentration of the polyarylate resin 15% by mass were stirred for 60 minutes in an environment at a temperature of 22° C., thereby yielding an evaluation liquid. The evaluation liquid was visually observed to evaluate solubility of the polyarylate resin in the tetrahydrofuran being a solvent according to the following criteria. A polyarylate resin evaluated as A or B was determined to be excellent in solubility in the solvent, and a polyarylate resin evaluated as C was determined to be poor in solubility in the solvent. Evaluation results of the polyarylate resins are shown in Table 6.

(Evaluation Criteria of Solubility in Solvent)

A: polyarylate resin was completely dissolved in tetrahydrofuran and neither white turbidity nor gelation of evaluation liquid was observed.

B: white turbidity of evaluation liquid was observed while gelation of evaluation liquid was not observed.

C: gelation of evaluation liquid was observed.

(Evaluation of Chargeability)

Chargeability of each of the photosensitive members was evaluated in an environment at a temperature of 25° C. and a relative humidity of 50%. Specifically, the surface of the photosensitive member was charged using a drum sensitivity test device (product of GENTEC CO., LTD.) under conditions of a charging current flowing in a charger of −10 μA and a rotational speed of the photosensitive member of 31 rpm. The surface potential of the photosensitive member was measured after the charging. The measured surface potential was taken to be a charge potential ($V_0$, unit: —V) of the photosensitive member. The charge potentials of the photosensitive members are shown in Table 7. It is thought that the photosensitive member has chargeability sufficient for actual use if the charge potential is at least −700 V and no greater than −640 V.

<Evaluation of Sensitivity>

Sensitivity of each of the photosensitive members were evaluated using a drum sensitivity test device (product of GENTEC CO., LTD.) in an environment at a temperature of 25° C. and a relative humidity of 50%. Specifically, the photosensitive member was charged so that the surface potential of the photosensitive member reaches −600 V using the drum sensitivity test device. Next, the surface of the photosensitive member is irradiated with monochromatic light (wavelength: 780 nm, exposure light quantity: 0.8 μJ/cm$^2$) taken out from light of a halogen lamp using a bandpass filter. The surface potential of the photosensitive member was measured once 80 milliseconds have elapsed from the monochromatic light irradiation, and taken to be a post-exposure potential ($V_L$, unit: −V). The post-exposure potentials of the photosensitive members are shown in Table 7.

<Evaluation of Abrasion Resistance>

The application liquid for charge transport layer formation prepared in <Multi-layer Photosensitive Member Production> described above was applied onto a polypropylene sheet (thickness: 0.3 mm) wound around an aluminum pipe (diameter: 78 mm), and dried at 120° C. for 40 minutes. In the manner described above, a polypropylene sheet with a charge transport layer (film thickness 30 μm) formed thereon was prepared. Subsequently, the charge transport layer was peeled off from the polypropylene sheet. The peeled charge transport layer was attached to a card-shaped member ("S-36", product of TABER Industries). A mass $M_A$ of the card-shaped member with the charge transport layer attached thereto was measured. Subsequently, the card-shaped member was mounted on a rotary table of a rotary ablation tester (product of Toyo Seiki Seisaku-sho, Ltd.). Then, the rotary table was rotated 1000 rotations at a rotational speed of 60 rpm with a wear ring ("CS-10", product of TABER Industries) with a load of 500 gf placed on the photosensitive layer on the card-shaped member. The charge transport layer on the rotary table was abraded in the manner described above. A mass $M_B$ of the card-shaped member with the charge transport layer attached thereto was measured again after the abrasion. Thereafter, an abrasion loss ($=M_A-M_B$, unit: mg) being a change in mass of the charge transport layer between before and after the abrasion was obtained. The measured abrasion losses are shown in Table 7. Abrasion resistance of each photosensitive member was evaluated from a corresponding abrasion loss according to the following criteria.

(Evaluation Criteria of Abrasion Resistance)

Good: abrasion loss of no greater than 7.5 mg

Poor: abrasion loss of greater than 7.5 mg

<Evaluation of Prevention of Failure Resulting from Member Contact>

The photosensitive member was mounted on an imaging drum ("DR-C4BC", product of Oki Data Corporation) so that a member (specifically, a charging roller) included in the imaging drum was made in contact with a partial area of the circumferential surface of the photosensitive member. In the following, the partial area of the circumferential surface of the photosensitive member in contact with the member is referred to as "member contact area". Also, an area of the circumferential surface of the photosensitive member out of contact with the member is referred to as "member non-contact area". The imaging drum with the photosensitive member mounted thereon was left to stand for 4 weeks in an environment at a temperature of 50° C. and a relative humidity of 85%. Directly after the 4-week leaving, the photosensitive member was mounted on the evaluation apparatus and an image (halftone image with a printing rate of 50%) was printed on one sheet of paper using the evaluation apparatus. The printed image was observed to evaluate prevention or non-prevention of an image defect resulting from contact with the member included in the image forming apparatus (the imaging drum) according to the following criteria. Evaluation results are shown in Table 7. It was determined that failure resulting from member contact was prevented in a photosensitive member rated as A or B and was not prevented in a photosensitive member rated as C.

(Evaluation Criteria of Prevention of Failure Resulting from Member Contact)

A: no image density difference recognized between image area corresponding to member contact area and image area corresponding to member non-contact area B: insignificant image density difference recognized between image area corresponding to member contact area and image area corresponding to member non-contact area C: definite image density difference recognized between image area corresponding to member contact area and image area corresponding to member non-contact area In Table 6, "Resin" indicates a polyarylate resin and "Solubility" indicates evaluation of solubility of a polyarylate resin in the solvent. The terms in Table 7 are as follows. "Photosensitive member" indicates a multi-layer photosensitive member. "HTM" indicates a hole transport material. "Resin" indicates a polyarylate resin. "$V_0$" indicates a charge potential. "$V_L$" indicates a post-exposure potential. "Application liquid preparation impossible" indicates the fact that it was impossible to prepare an application liquid for charge transport layer formation due to insolubility of a corresponding polyarylate resin in the solvent for preparing the application liquid for charge transport layer formation.

TABLE 6

| Resin | Solubility |
|---|---|
| A | A |
| B | A |
| C | A |
| D | A |
| E | A |
| F | A |
| G | A |
| H | C |
| I | A |
| J | C |
| K | A |
| L | C |
| M | A |
| N | A |
| O | B |
| P | A |
| Q | C |
| R | A |
| S | B |
| T | C |

TABLE 7

| | Photosensitive member | HIM | Resin | $V_0$ [−V] | $V_L$ [−V] | Failure Resulting from Member Contact | Abrasion loss [mg] |
|---|---|---|---|---|---|---|---|
| Example 1 | A-1 | HTM-1 | A | 673 | 50 | B | 3.2 |
| Example 2 | A-2 | HTM-2 | A | 689 | 56 | A | 3.1 |
| Example 3 | A-3 | HTM-3 | A | 689 | 46 | B | 3.0 |
| Example 4 | A-4 | HTM-4 | A | 693 | 58 | A | 3.5 |
| Example 5 | A-5 | HTM-5 | A | 695 | 49 | A | 3.1 |
| Example 6 | A-6 | HTM-6 | A | 680 | 75 | A | 3.7 |
| Example 7 | A-7 | HTM-7 | A | 680 | 88 | A | 2.9 |
| Example 8 | A-8 | HTM-5 | B | 681 | 54 | B | 2.9 |
| Example 9 | A-9 | HTM-5 | C | 691 | 51 | A | 3.6 |
| Example 10 | A-10 | HTM-5 | D | 684 | 58 | A | 4.5 |
| Example 11 | A-11 | HTM-5 | E | 684 | 53 | B | 3.7 |
| Example 12 | A-12 | HTM-5 | F | 694 | 49 | A | 2.8 |
| Example 13 | A-13 | HTM-5 | G | 648 | 53 | A | 2.7 |
| Example 14 | A-14 | HTM-7 | G | 683 | 87 | A | 2.5 |
| Comparative Example 1 | B-1 | HTM-5 | H | | | Application liquid preparation impossible | |
| Comparative Example 2 | B-2 | HTM-5 | I | 691 | 55 | C | 3.5 |
| Comparative Example 3 | B-3 | HTM-5 | J | | | Application liquid preparation impossible | |
| Comparative Example 4 | B-4 | HTM-5 | K | 684 | 52 | C | 3.1 |
| Comparative Example 5 | B-5 | HTM-5 | L | | | Application liquid preparation impossible | |
| Comparative Example 6 | B-6 | HTM-5 | M | 681 | 52 | B | 8.9 |
| Comparative Example 7 | B-7 | HTM-5 | N | 680 | 56 | A | 10.3 |
| Comparative Example 8 | B-8 | HTM-5 | O | 674 | 60 | A | 7.6 |
| Comparative Example 9 | B-9 | HTM-5 | P | 677 | 55 | A | 7.6 |
| Comparative Example 10 | B-10 | HTM-5 | Q | | | Application liquid preparation impossible | |
| Comparative Example 11 | B-11 | HTM-5 | R | 677 | 54 | C | 9.3 |

TABLE 7-continued

|  | Photosensitive member | HIM | Resin | $V_0$ [−V] | $V_L$ [−V] | Failure Resulting from Member Contact | Abrasion loss [mg] |
|---|---|---|---|---|---|---|---|
| Comparative Example 12 | B-12 | HTM-5 | S | 683 | 50 | C | 8.4 |
| Comparative Example 13 | B-13 | HTM-5 | T |  |  | Application liquid preparation impossible |  |

As can be understood from Table 5, the polyarylate resins H to T each were not a polyarylate resin encompassed in the polyarylate resin (PA). Therefore, the polyarylate resins H, J, L, Q, and T had poor solubility in the solvent and an application liquid for charge transport layer formation was not prepared with any of the polyarylate resins H, J, L, Q, and T with a result that a photosensitive layer (specifically, the charge transport layer) was not formed as shown in Tables 6 and 7. Furthermore, failure resulting from member contact of a photosensitive member was not prevented when any of the polyarylate resins I, K, R, and S was contained in the photosensitive layer of the photosensitive member as shown in Table 7. In addition, abrasion resistance of a photosensitive member was not increased when any of the polyarylate resins M, N, O, P, R, and S was contained in the photosensitive layer of the photosensitive member as shown in Table 7.

By contrast, the polyarylate resins A to G each were a polyarylate resin encompassed in the polyarylate resin (PA) as can be understood from Table 5. Therefore, the polyarylate resins A to G had excellent solubility in the solvent as shown in Table 6. As shown in Table 7, failure resulting from member contact was prevented and abrasion resistance was increased in a photosensitive member including a photosensitive layer containing any of the polyarylate resins A to G. As shown in Table 7, failure resulting from member contact was prevented and abrasion resistance was increased in the photosensitive member including the photosensitive layer containing any of the polyarylate resins A to G without impairing chargeability and sensitivity of the photosensitive member.

It was demonstrated from the above that: the polyarylate resin according to the present disclosure that encompasses the polyarylate resins A to G has excellent solubility in the solvent; failure resulting from member contact of a photosensitive member including a photosensitive layer containing the polyarylate resin can be prevented; and abrasion resistance of the photosensitive member can be increased. It was also demonstrated that in the photosensitive member according to the present disclosure that encompasses the multi-layer photosensitive members (A-1) to (A-14) including a photosensitive layer containing any of the polyarylate resins A to G, a photosensitive layer is favorably formed, failure resulting from member contact can be prevented, and abrasion resistance can be increased.

What is claimed is:
1. A polyarylate resin comprising
repeating units represented by formulas (1), (2), (3), and (4), wherein
a third percentage is greater than 0% and less than 50%, the third percentage being a percentage of the number of repeats of the repeating unit represented by the formula (3) relative to a total of the number of repeats of the repeating unit represented by the formula (1) and the number of repeats of the repeating unit represented by the formula (3), and
a fourth percentage is at least 35% and less than 70%, the fourth percentage being a percentage of the number of repeats of the repeating unit represented by the formula (4) relative to a total of the number of repeats of the repeating unit represented by the formula (2) and the number of repeats of the repeating unit represented by the formula (4),

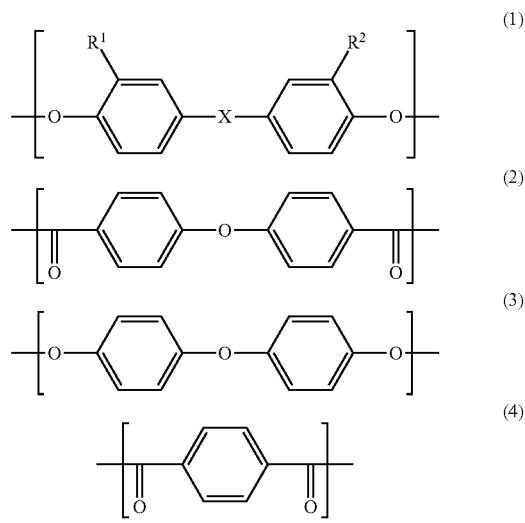

where in the formula (1),
$R^1$ and $R^2$ each represent a methyl group and X represents a divalent group represented by formula (X1), or
$R^1$ and $R^2$ each represent a hydrogen atom and X represents a divalent group represented by formula (X2),

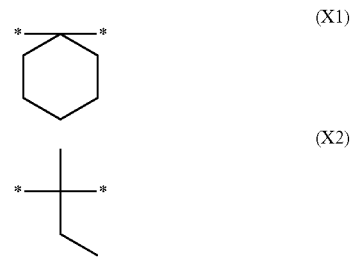

where in the formulas (X1) and (X2), * represents a bond, and
wherein
a first percentage differs from a second percentage and the fourth percentage, the third percentage differs from the second percentage and the fourth percentage, the first percentage is a percentage of the number of repeats of the repeating unit represented by the formula (1) relative to the total of the number of repeats of the repeating unit represented by the formula (1) and the number of repeats of the repeating unit represented by the formula (3), and the second percentage is a percentage of the number of repeats of the repeating unit represented by the formula (2) relative to the total of the number of repeats of the repeating unit represented by the formula (2) and the number of repeats of the repeating unit represented by the formula (4).

2. The polyarylate resin according to claim 1, wherein in the formula (1), $R^1$ and $R^2$ each represent a methyl group and X represents a divalent group represented by the formula (X1).

3. The polyarylate resin according to claim 1, wherein in the formula (1), $R^1$ and $R^2$ each represent a methyl group and X represents a divalent group represented by the formula (X1), and the fourth percentage is at least 40% and less than 70%.

4. The polyarylate resin according to claim 1, wherein in the formula (1), $R^1$ and $R^2$ each represent a methyl group and X represents a divalent group represented by the formula (X1), and the third percentage is at least 30% and less than 50%.

5. The polyarylate resin according to claim 1, wherein in the formula (1), $R^1$ and $R^2$ each represent a methyl group and X represents a divalent group represented by the formula (X1), and the polyarylate resin further comprises an end group having a halogen atom.

6. The polyarylate resin according to claim 1, wherein in the formula (1), $R^1$ and $R^2$ each represent a hydrogen atom and X represents a divalent group represented by the formula (X2), and the fourth percentage is at least 35% and no greater than 45%.

7. The polyarylate resin according to claim 1, wherein the third percentage is greater than 30% and less than 50%.

8. The polyarylate resin according to claim 1, wherein the polyarylate resin does not comprise a repeating unit represented by formula (5)

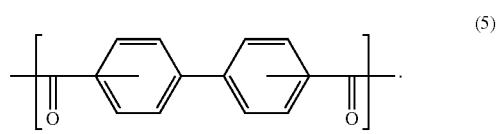

9. An electrophotographic photosensitive member comprising:

a conductive substrate; and a photosensitive layer, wherein the photosensitive layer contains a charge generating material, a hole transport material, and a binder resin, and the binder resin includes the polyarylate resin according to claim 1.

10. The electrophotographic photosensitive member according to claim 9, wherein the hole transport material includes a compound represented by formula (19), (20), (21), or (22),

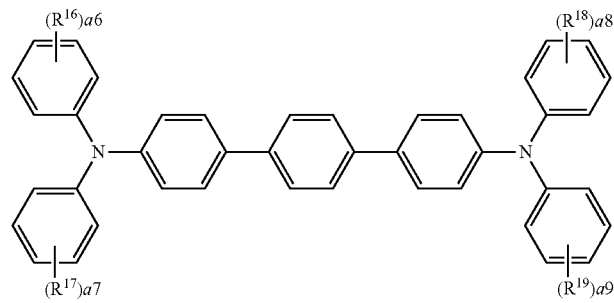

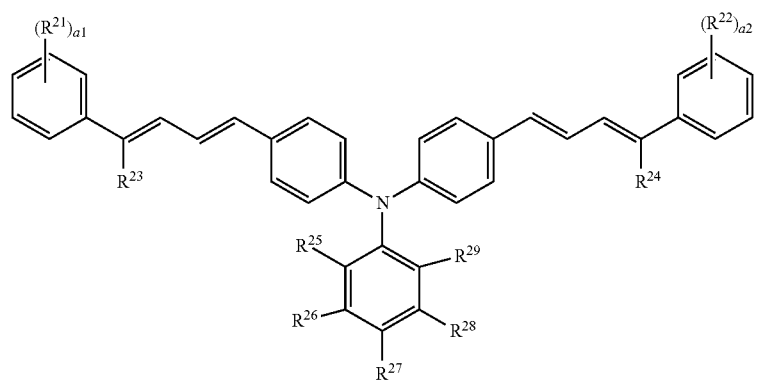

-continued

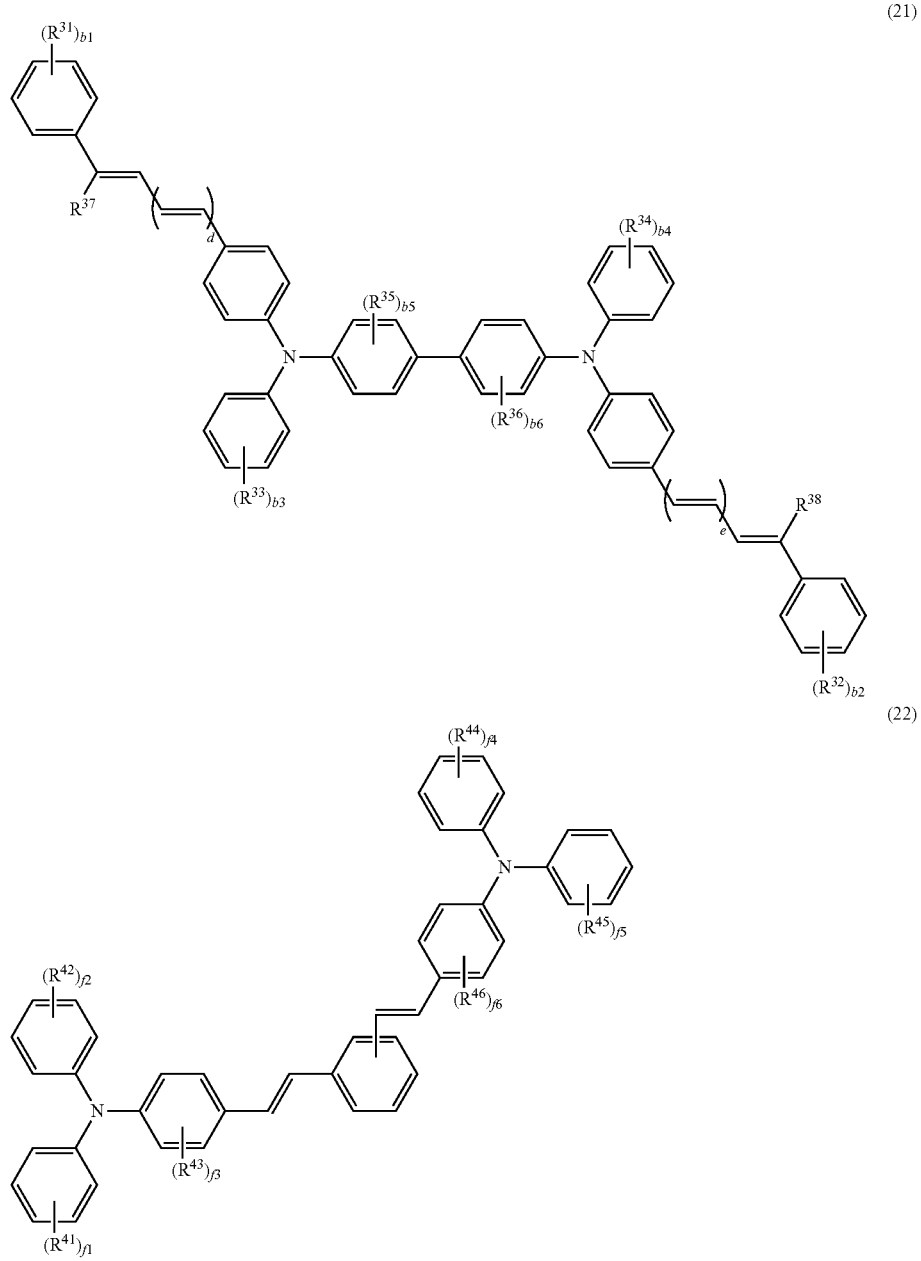

in the formula (19), $R^{16}$, $R^{17}$, $R^{18}$, and $R^{19}$ each represent, independently of one another, an alkyl group with a carbon number of at least 1 and no greater than 6 or an alkoxy group with a carbon number of at least 1 and no greater than 6, and a6, a7, a8, and a9 each represent, independently of one another, an integer of at least 0 and no greater than 5, in the formula (20): $R^{21}$ and $R^{22}$ each represent, independently of one another, a phenyl group, an alkyl group with a carbon number of at least 1 and no greater than 8, or an alkoxy group with a carbon number of at least 1 and no greater than 8; $R^{23}$ to $R^{29}$ each represent, independently of one another, a hydrogen atom, an alkyl group with a carbon number of at least 1 and no greater than 8, a phenyl group optionally substituted with an alkyl group with a carbon number of at least 1 and no greater than 8, or an alkoxy group with a carbon number of at least 1 and no greater than 8; any adjacent two of the chemical groups $R^{25}$ to $R^{29}$ may be bonded to form a ring; and a1 and a2 each represent, independently of one another, an integer of at least 0 and no greater than 5, in the formula (21): $R^{31}$ to $R^{36}$ each represent, independently of one another, a phenyl group or an alkyl group with a carbon number of at least 1 and no greater than 8; $R^{37}$ and $R^{38}$ each represent, independently of one another, a hydrogen atom, a phenyl group, or an alkyl group with a carbon number of at least 1 and no greater than 8; b1, b2, b3, and b4 each represent, independently of one another, an integer of at least 0 and no greater than 5; b5 and b6 each represent, independently of one another, an integer of at least 0 and no greater than 4; and d and e each represent, independently of one another, 0 or 1, and in the formula (22), $R^{41}$ to $R^{46}$ each represent, independently of one another, a phenyl group, an alkyl group with a carbon number of at least 1 and no greater than 8, or an alkoxy group with a carbon number of at least 1 and no greater than 8; f1, f2, f4, and f5 each represent, independently of one another, an integer of at least 0 and no greater than 5; and f3 and f6 each represent, independently of one another, an integer of at least 0 and no greater than 4.

11. The electrophotographic photosensitive member according to claim 9, wherein the hole transport material includes a compound represented by formula (HTM-1), (HTM-2), (HTM-3), (HTM-4), (HTM-5), (HTM-6), or (HTM-7)

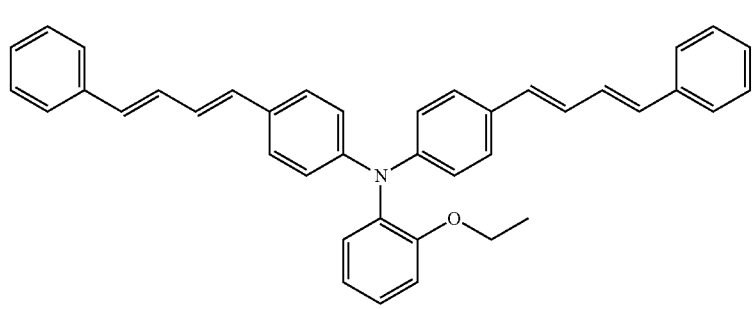

(HTM-1)

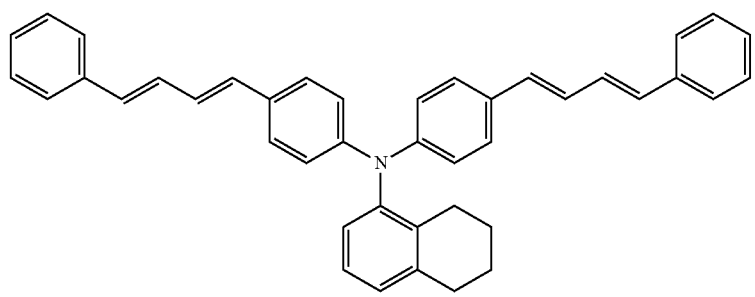

(HTM-2)

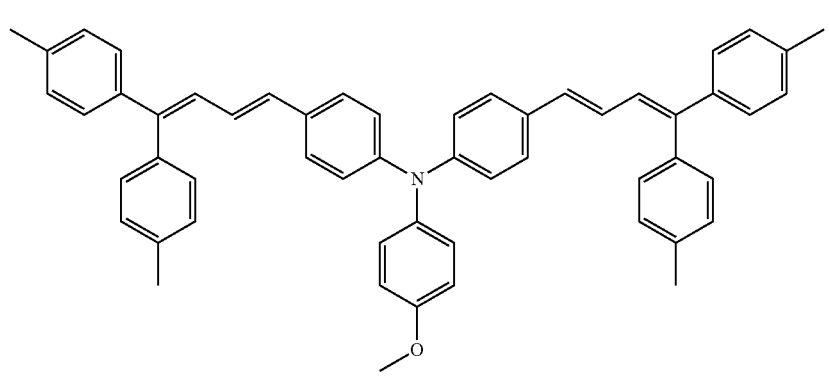

(HTM-3)

(HTM-4)
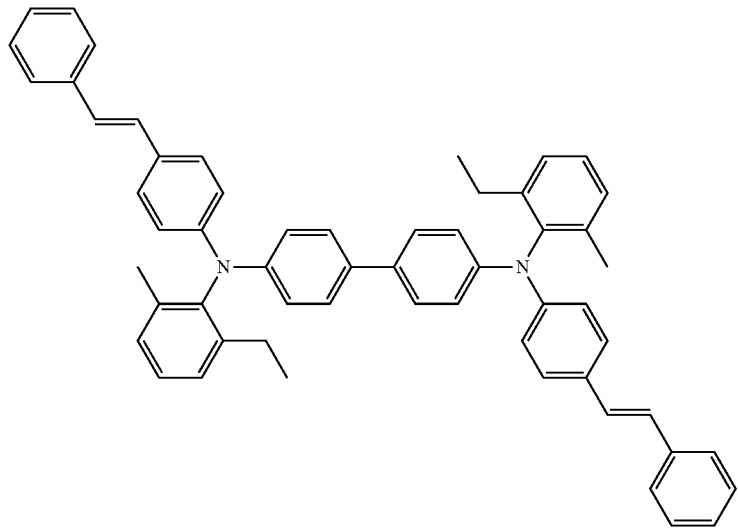
(HTM-5)
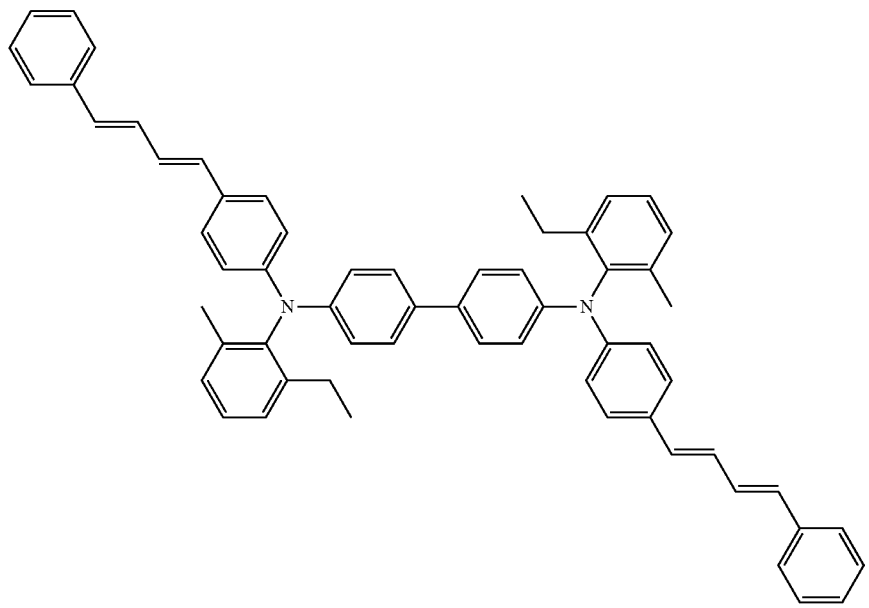
(HTM-6)
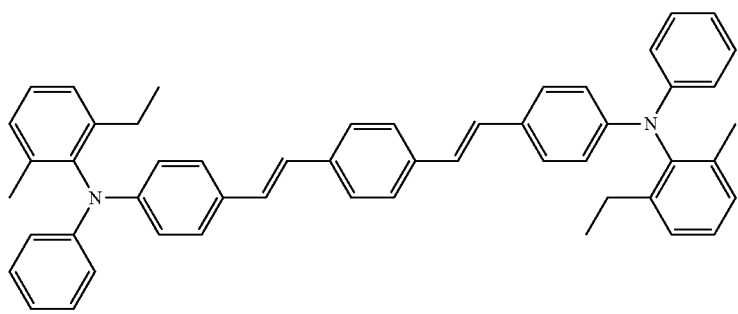

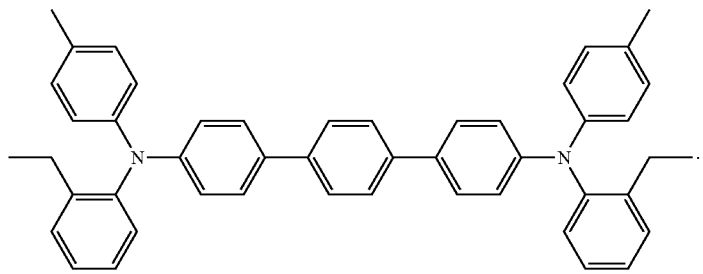
(HTM-7)
12. The electrophotographic photosensitive member according to claim 9, wherein
the photosensitive layer includes a charge generating layer containing the charge generating material and a charge transport layer containing the hole transport material and the binder resin, and
the charge transport layer provided as an outermost layer.
* * * * *